(12) United States Patent
Gonzalez et al.

(10) Patent No.: US 8,413,256 B2
(45) Date of Patent: Apr. 2, 2013

(54) CONTENT PROTECTION AND DIGITAL RIGHTS MANAGEMENT (DRM)

(75) Inventors: Francisco Gonzalez, Atlanta, GA (US); Edgar V. Shrum, Jr., Smyrna, GA (US)

(73) Assignee: Cox Communications, Inc., Atlanta, GA (US)

( * ) Notice: Subject to any disclaimer, the term of this patent is extended or adjusted under 35 U.S.C. 154(b) by 709 days.

(21) Appl. No.: 12/548,420

(22) Filed: Aug. 26, 2009

(65) Prior Publication Data
US 2010/0058485 A1    Mar. 4, 2010

Related U.S. Application Data

(60) Provisional application No. 61/091,986, filed on Aug. 26, 2008.

(51) Int. Cl.
*G06F 7/04* (2006.01)
(52) U.S. Cl. .......................................................... 726/27
(58) Field of Classification Search ..................... 726/27
See application file for complete search history.

(56) References Cited

U.S. PATENT DOCUMENTS

| | | | |
|---|---|---|---|
| 7,934,263 B2* | 4/2011 | Singer et al. | 726/26 |
| 2004/0187014 A1* | 9/2004 | Molaro | 713/200 |
| 2006/0156416 A1* | 7/2006 | Huotari et al. | 726/27 |
| 2008/0120675 A1* | 5/2008 | Morad et al. | 725/120 |
| 2009/0300724 A1* | 12/2009 | Cho et al. | 726/4 |

* cited by examiner

*Primary Examiner* — Kaveh Abrishamkar
(74) *Attorney, Agent, or Firm* — Merchant & Gould

(57) ABSTRACT

An end to end content protection system that includes enhanced digital rights management (DRM). The system provides content delivery to devices over a managed multimedia home network. The system includes a domain manager for receiving content, wherein the domain manager includes a cable card, conditional access component and a MSO security application and a managed client device, coupled to and registered with the domain manager, the managed client device running a security DRM application client, the managed client device communicates with the MSO security application in the domain manager, wherein the MSO security application of the domain manager and the security DRM application client of the managed client instantiate a preferred DRM as an overlay on top of any other content protection scheme.

20 Claims, 24 Drawing Sheets

CONTENT PROTECTION AND DIGITAL RIGHTS MANAGEMENT (DRM)

FIELD OF THE INVENTION

This disclosure relates in general to content protection systems, and more particularly to end to end content protection system that includes enhanced digital rights management (DRM).

BACKGROUND

Cable and satellite content providers provide receivers that support both conventional one-way communication from the TV signal headend to the receiver and two-way communication between the headend and the receiver. Such two-way communication is often used to support "interactive digital video," such as pay-per-view, video-on-demand, VCR-like pause, rewind, and fast forward, Internet TV, etc.

The Open Cable Application Platform (OCAP) defines an application platform interface implemented by the TV receiver platform that allows software applications, downloaded to the receiver, to communicate with the receiver through a common standard interface and exploit its functionality. In turn, the OCAP interface communicates through the receiver's communication port with the TV signal headend. In this way, for example, viewer purchases of video-on-demand may be facilitated, with the purchased video then transmitted from the headend to the receiver, to be decrypted and then displayed on the TV screen.

Today, set top boxes provide very basic conditional access. However, the cable industry is eyeing the advantages of providing access to home networks, gateways, IP devices, computers and cell phones. However, to provide access to content, the delivery of content must be managed. For example, a content provider needs to manage what content goes to which device.

Removable cards provide proprietary decryption functionality for received TV audio and video thereby enabling Digital Rights Management (DRM) by content providers. Removable cards enable consumers to purchase TV receivers, such as set-top boxes, in one provider area, which can then be used in another provider area. The set-top box remains useful in all cable provider areas because the remaining components of the receiver typically are not proprietary.

DRM is the enabling technology behind new business models based on content delivery to devices—any content, to any device, any time, anywhere, anyhow, with advertising. DRM functionality is just as important as the user interface and Program Guide (PG) in influencing what can be done with content, and is thus a major factor in influencing the user experience.

A DRM technology solution should provide product usability that is recognized for its simplicity and consistency, where DRM is at the core of enabling ease of use of content across platforms. The DRM technology should also support wireless growth by enabling video to mobile devices using DRM. Further, the DRM technology should meet major market product deployment and enhancements within a tight timeframe to allow quick adaptation quickly to the customers' ever changing modes of content consumption.

It is possible for a cable system operator to provide its own DRM. However, different devices may be attached to the cable system. Some of the devices could be managed by the cable system operator, while others are not managed by the cable system operator. In the latter case, these other devices may use different access control technologies.

As indicated above, content is made available to these IP devices in home networking. Nevertheless, conditional access is terminated at a central point in the home, e.g., a gateway. For that termination point, a new content management system must have a new content protection management plane that provides link protection between a source and a sync.

Digital Transmission Content Protection (DTCP) is a digital rights management (DRM) technology. DTCP is designed to protect audio and audiovisual content from unauthorized copying, intercepting and tampering as it is transported over high-performance digital interconnects within a localized network, such as a home or personal digital network environment. However, DTCP alone is not good enough as to wide band switching services in terms of content delivery, advertising and commerce. DTCP fails to express business rules in terms of what can be done with the content, e.g., when, how content can be combined with advertising, how content is sent to a combination of cell phones, IP terminals, computers and what formats and flavors can be transcoded.

Accordingly, providing a managed security domain onto a third party domain would allow the control and transfer of content to and from all devices.

SUMMARY OF THE INVENTION

To overcome the limitations described above, and to overcome other limitations that will become apparent upon reading and understanding the present specification, embodiments for end to end content protection system that includes enhanced digital rights management (DRM) are disclosed.

The above-described problems are solved by providing linear and non-real-time persistent content delivered to traditional and IP devices over a managed multimedia home network as well as personal media and mobile devices.

An embodiment includes a system that provides content delivery to devices over a managed multimedia home network. The system includes a domain manager for receiving content, wherein the domain manager includes a cable card, conditional access component and a MSO security application and a managed client device, coupled to and registered with the domain manager, the managed client device running a security DRM application client, the managed client device communicates with the MSO security application in the domain manager, wherein the MSO security application of the domain manager and the security DRM application client of the managed client instantiate a preferred DRM as an overlay on top of any other content protection scheme.

In another embodiment, a method for providing content delivery to devices over a managed multimedia home network is disclosed. The method includes receiving content at a domain manager, wherein the domain manager includes a cable card, conditional access component and a MSO security application, requesting content from the domain manager by a managed client device that is coupled to and registered with the domain manager, wherein the managed client device running a security DRM application client, the managed client device communicates with the MSO security application in the domain manager and instantiating a preferred DRM as an overlay on top of any other content protection using the MSO security application of the domain manager and the security DRM application client of the managed client.

A computer readable medium including executable instructions which, when executed by a processor, provides content delivery to devices over a managed multimedia home network, is disclosed. The computer readable medium includes instructions executable by the processor to receive content at a domain manager, wherein the domain manager includes a cable card, conditional access component and a MSO security application, to request content from the domain manager by a managed client device that is coupled to and registered with the domain manager, wherein the managed client device running a security DRM application client, the managed client device communicates with the MSO security application in the domain manager and to instantiate a preferred DRM as an overlay on top of any other content protection using the MSO security application of the domain manager and the security DRM application client of the managed client.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to end to end content protection system that includes enhanced digital rights management (DRM) are disclosed. Linear and non-real-time persistent content delivered to traditional and IP devices over a managed multimedia home network as well as personal media and mobile devices.

Figure 1:
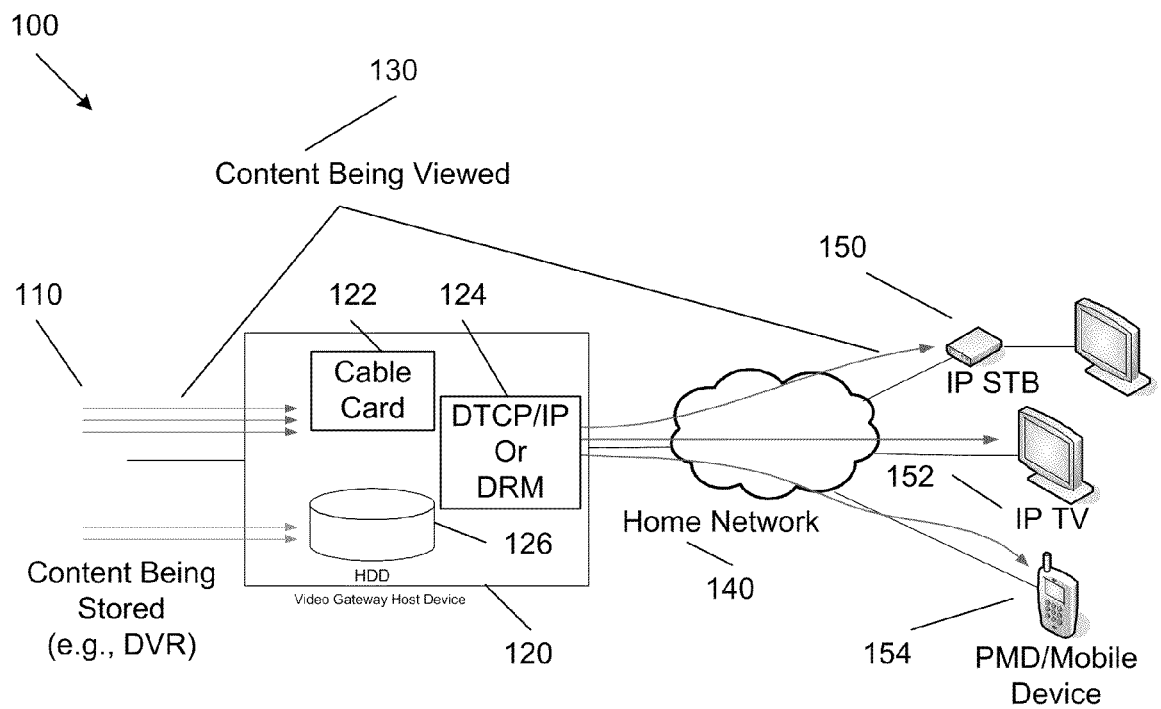
FIG. 1 illustrates a high level home gateway architecture according to an embodiment of the invention.

FIG. 1 illustrates a high level home gateway architecture 100 according to an embodiment of the invention. In FIG. 1, content 110 is received at a video gateway host device 120. The video gateway host device 120 includes a cable card 122 and conditional access component 124. The basic content protection aspect of a video gateway host device 120 is the fact that it terminates the conditional access component with a single card in the home, thereby enabling the distribution of content to IP terminals using content protection mechanisms managed by the DRM system. At least two gateway options may be implemented. The first gateway option is a video centric device based on a DVR platform. The second gateway option is a data centric device with additional video processing capability plus the ability to bridge and manage both Video and Data networks in the home.

The video gateway host device 120 may include a hard disk drive (HDD) 126 to store content, such as provided by DVRs. One approach to achieve this goal would be through the use of converged CPE and home networking architectures, Conditional access is terminated at a single cable card 122, e.g., a Multi-Stream CableCard, in the gateway device 120. Then, video may be distributed over IP over MoCA (Multimedia over Coax Alliance) to tunerless, CableCard-less IPTV class clients running DRM. In FIG. 1, the video being viewed 130 is transmitted through the home network 140 to tunerless, CableCard-less IPTV class clients running DRM, such as IP set-top box (STB) 150, IP TV 152 and personal media device (PMD)/mobile device 154.

DRM technology in a gateway 120 as shown in FIG. 1 facilitates bridging or interfacing with third party retail CPE running third party DRM technologies. The gateway 120 may be implemented to provide a single managed content protection infrastructure with a common set of policies across systems, thereby providing significant gains in operational efficiency.

The DRM component 124 is configured to work with devices for providing interactive digital cable services delivered over a cable video network, such as Tru2Way devices. The DRM component 124 takes the output of CableCard conditional access devices 122 and re-encrypts and maps rights into its own security domain. The DRM component 124 is expected to overlay the residential service domain, i.e., a networking and QoS domain, such as Tru2Way Residential Service Domain that is being defined by CableLabs as part of the OCAP Home Networking extensions.

The baseline content protection technology for this domain can be DTCP/IP. OpenCable Application Platform (OCAP) is the Java-based software/middleware portion of the Open-Cable initiative and provides an operating system layer designed for consumer electronics that connect to a cable television system. Proprietary messaging control is replaced with a very basic digital transmission content protection (DTCP), which then can be augmented by overlaying a more robust digital rights management (DRM). Previously, the middleware ran on a set top box and was disposed between an application and the hardware drivers. The middleware has both a central bus component and headend server components.

Therefore, the DRM component 124 is expected to be able to interoperate with DTCP. The goals for the DRM component 124 include providing solutions that are easy to use, result in a reliable and consistent user experience, and provide a robust and manageable security architecture. The DRM component 124 is also configured to provide a security platform capable of achieving acceptance by major content providers and industry associations. The DRM component 124 also enables a network operator to manage its own security domain for the multimedia home network and provides a seamless integration with existing back office systems.

Figure 2:
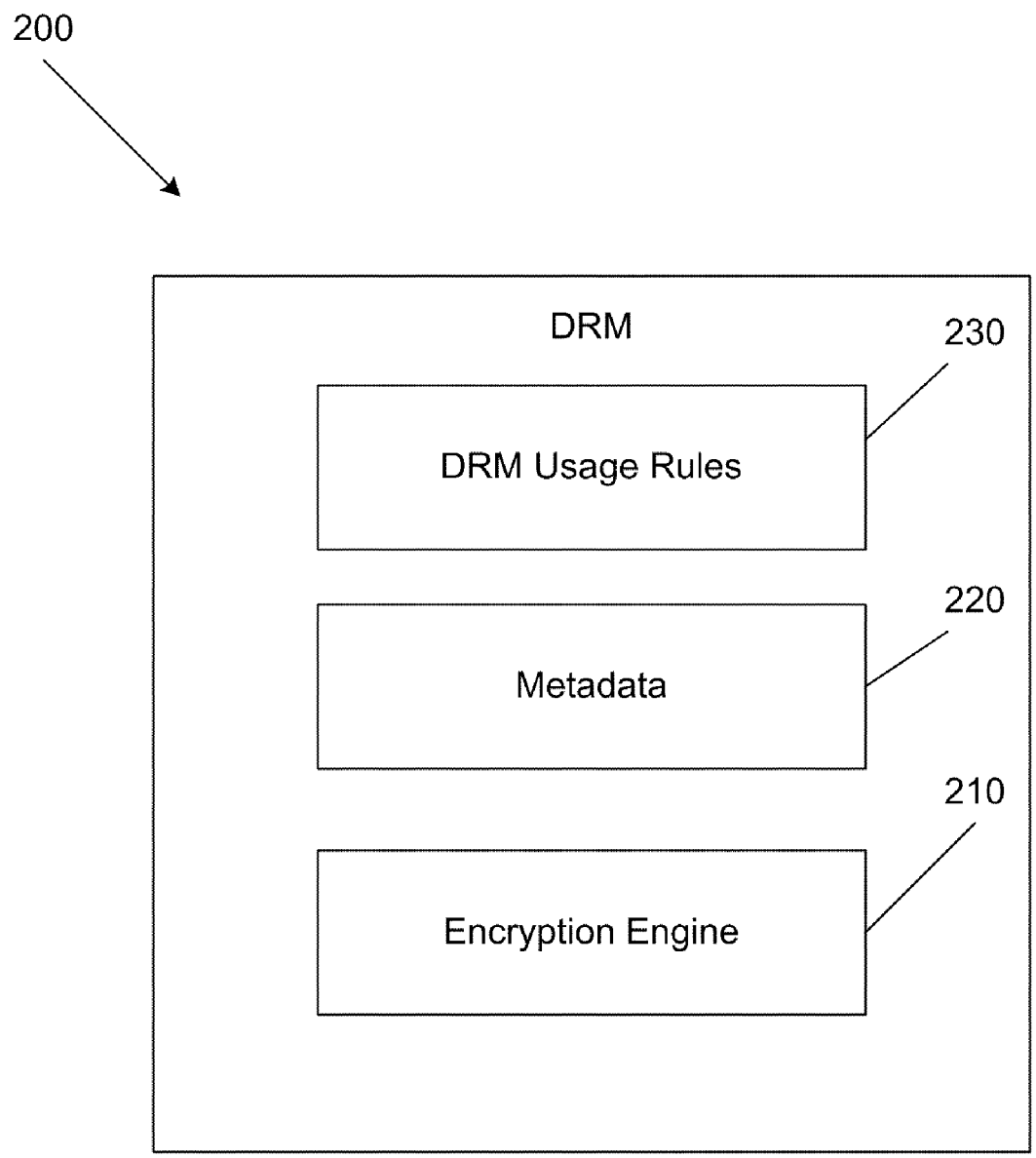
FIG. 2 is a diagram showing components of DRM according to an embodiment of the invention.

FIG. 2 is a diagram showing components of DRM 200 according to an embodiment of the invention. In FIG. 2, the DRM 200 has an encryption engine 210, metadata 220 to describe the content and a set of rules 230. A mediation service, as will be described below, can act on any of those. For example, a mediation service can take a set of rules 230 from one vendor and massage them so they look like the rules for another vendor.

Figure 3:
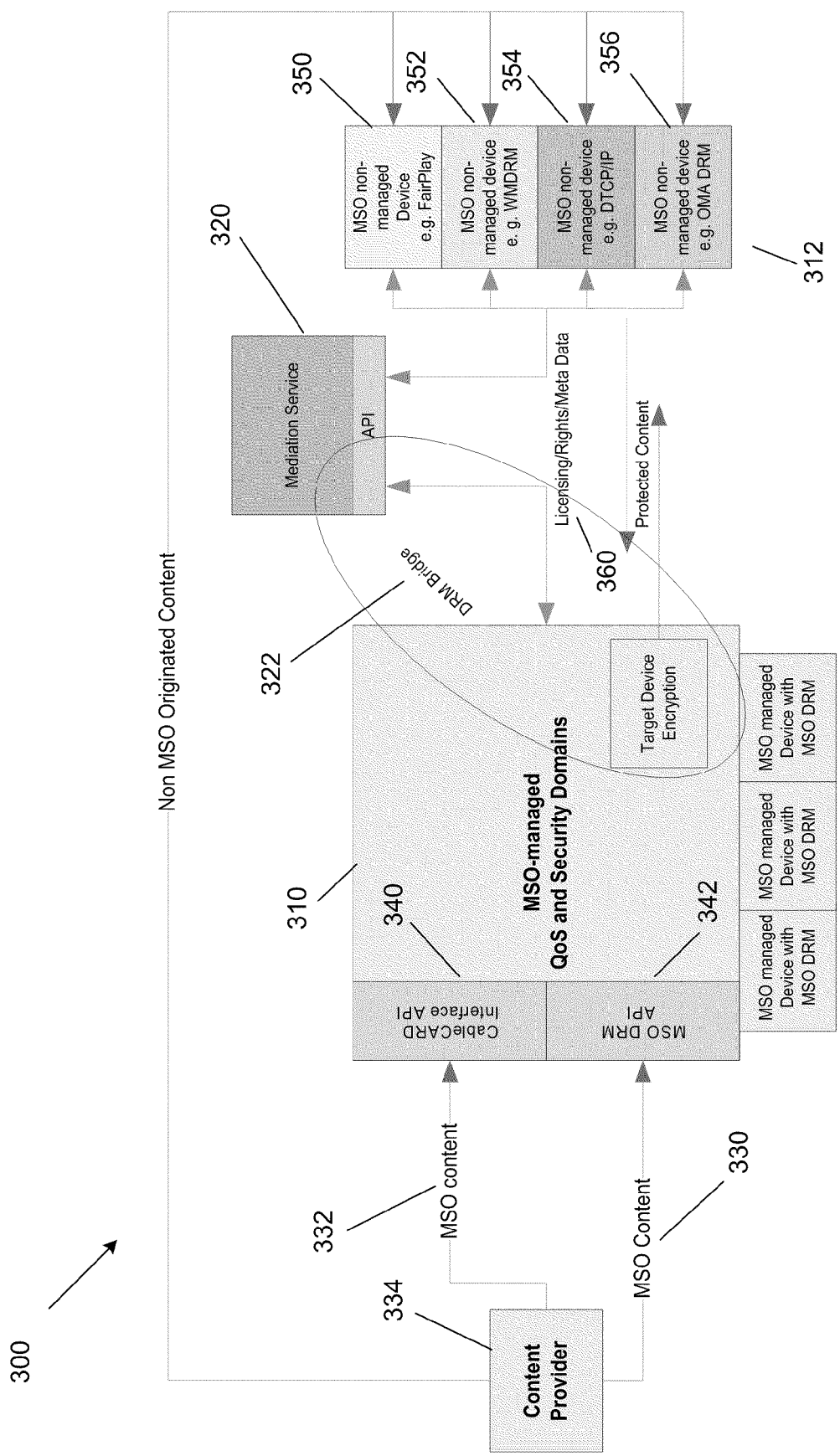
FIG. 3 illustrates the DRM bridging according to an embodiment of the invention.

FIG. 3 illustrates the DRM bridging 300 according to an embodiment of the invention. In FIG. 3 DRM bridging is provided by the MSO managed, quality of service security domain 310, the mediation service 320 and other third party devices. The mediation service 320 is like a bridge 322.

FIG. 3 shows content 330, 332 being received from a content provider 334. MSO content 330 is received by Cable-Card interface API 340. MSO content 332 is received by MSO DRM API 342. Non-MSO content 334 is received by non-managed devices 350, 352, 354, 356.

When content crosses content protection domains, the content is exported from a managed domain 310 to a third party, wherein the mediation service 320 maps the rights. More specifically, when content crosses content protection domains, i.e., exported from the MSO managed domain 310 to 3rd party DRM domain 312, a mediation service 320 maps the rights expressed in the MSO usage rules (230 shown in FIG. 2) and the CUI into a license 360 suitable for use with that third party DRM. The specifics of this mapping are dictated by each third party DRM vendor or by a commonly agreed service. The DRM license 360 generated by the mediation service 320 will only include the restricted set of rights that can be mapped into the terms of the DRM license 360 applicable to the third party DRM.

Similarly, when content is acquired from a device managed under a third party DRM, the mediation service 320 will be responsible for mapping the rights expressed in the content DRM license 360 into a set of usage rules that detail the content usage rights within the managed domain 310.

The mediation service 320 will also be responsible for providing encryption keys and required encryption algorithm to the content source, i.e., MSO-managed domain 310, so the MSO-managed domain 310 can rescramble the content into an encryption scheme supported by the sink device/domain 312. The content is then protected content 370, which may be passed to the non-managed devices 350, 352, 354, 356.

The combination of the mediation service 320 and the security domain 310 results in a solution that interoperates, in terms of content protection and metadata mapping, with other content protection and DRM technologies, e.g. Apple's Fair-Play, Microsoft WMDRM, Intel's DTCP/IP, Marlin, and the wireless OMA DRM, which are accessed by non-managed device 350, 352, 354, 356.

The DRM bridge 322 basically implements two functions: (1) re-encryption and (2) metadata mapping. The DRM bridge 322 re-encrypts clear content using the cryptographic requirements of the target DRM system. The DRM bridge 322 maps usage rights and license information from the form used by the source DRM system to the form used by the target DRM system. The MSO DRM API 342 provides an open specification for third party DRM vendors to use to develop the respective bridges. Having a single API exposed should result in more consistent and reliable implementations.

The DRM system 300 is designed to ensure that high-value content remains protected according to the MSO usage rules. Security PROFILES are applied to network transport, inter-device transfer and content storage to ensure that content remains protected throughout its life-cycle. These security profiles are designed to provide protection of the content itself, the keys used to scramble the content, the content metadata, and user and device registration information.

Table 1 lists the minimum protections for the security profiles that must be applied to content and data within the DRM system:

| | |
|---|---|
| Content protection | At least AES 128-bit scrambling in CBC mode or equivalent. |
| Content Metadata and DRM message authentication | Authentication using HMAC with 256-bit key and SHA-2 (256 bit) Hash, or with RSA 2048-bit signature (RSASSA-PKCS1-v1_5 over (at least) SHA-1 Hash, or equivalent. |
| Content Metadata and DRM message encryption (where necessary) | RSA 2048-bit encryption with OAEP combined with AES 128-bit scrambling in CBC mode, or equivalent. |
| Transport Layer Security | At least TLS_RSA_WITH_AES_256_CBC_SHA Cipher Suite for TLS exchanges. Both Server and Client authentication and OCSP check during connection establishment. |

Table 2 lists the keys required for the security profiles.

| | |
|---|---|
| Key Usage | Separate keys are used for authentication and encryption. The key used in TLS certificates is reserved for TLS use only. |

| | |
|---|---|
| Key Expiration | Symmetric keys are used as session keys or content protection keys are freshly generated and expire at the end of the session or on removal of the content. Device registration keys are permanently assigned to a device and are not expected to expire. Other asymmetric keys have expiration periods commensurate with their usage, but these periods are planned to be in excess of 10 years. |
| Device Registration Keys | Asymmetric Keys - 2048 bit RSA or equivalent |
| User Domain Keys | Asymmetric Keys - 2048 bit RSA or equivalent |
| Content Protection Keys | Symmetric Keys - 128-bit AES or equivalent |
| Symmetric Key Exchange | Symmetric key encrypted by 2048-bit RSA key or equivalent. Alternative schemes using proven technologies (e.g. DH Key Exchange, DFAST key scrambling) will be considered. |
| Message Digest | All message digests are at least SHA-1 (160-bit). |
| Random Number Generation | The RNG is in compliance to FIPS 140-2 Section 4.7 tests for randomness |

Figure 4:
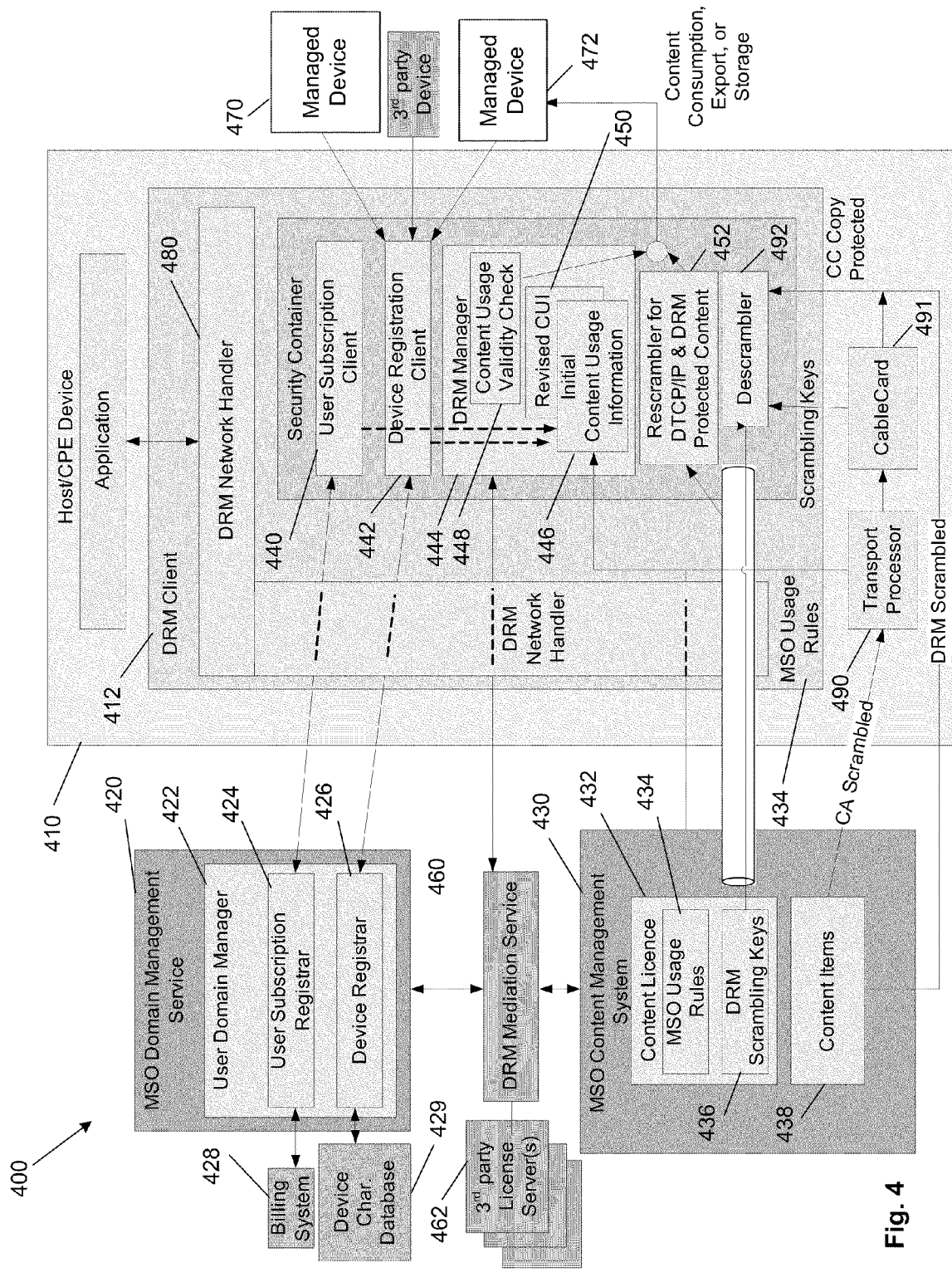
FIG. 4 illustrates an overview of the DRM system according to an embodiment of the invention.

FIG. 4 illustrates an overview of the DRM system 400 according to an embodiment of the invention. In FIG. 4, the DRM system 400 includes the customer premises equipment (CPE) 410, the Multiple System Operator (MSO) domain management service 420 and the MSO content management service 430. The DRM client 412 of the CPE 410 includes a security container 440. The security container 440 provides for the protection of content and other secure data within a constrained environment where cryptographic operations can be safely performed. The security container 440 should be protected against physical and logical attacks that would expose scrambled content or encrypted data, or allow an attacker to modify authenticated messages. The security container 440 also provides storage for critical keys that are used to manage scrambling, descrambling, key exchange and authentication operations. For example, the rescrambler 452 can rescramble the content into an encryption scheme supported by a managed device 470, 472.

The DRM 400 expects each managed device to include a security container 440 with clearly defined boundaries and protection mechanisms to prevent disclosure of high-valued content and other critical information. Where devices are also DTCP/IP enabled, the security container 440 is also used to store DTLA keys and manage DTCP/IP link-layer protection.

The security container 440 can be implemented in a device specific manner. For example, in a system that contains a Transport Processor, the security container 440 may be within the secure area of that processor. Alternatively, in a PC, the security container 440 may be supplied on a smart card or similar attachable device. While the DRM client 412 takes advantage of hardware if present, solutions for software only approaches should be supported. While it is desirable that the security container 440 is deployed in a hardware device, other solutions that do not require additional hardware elements may also be implemented.

The MSO content management system 430 includes a DRM License 432 for MSO delivered content that contains the MSO Usage Rules 434 and other license information relating to content items 438 and is delivered in conjunction with the content items 438. The content items 438 may be provided as CA scrambled content 439 to transport processor 490 in the CPE device 410. The transport processor 490 provides information to enable the generation of the initial set of Content Usage Information 446. The transport processor 490 also provides the CA scrambled content 439 to the CableCard 491 for processing. The CableCard 491 provides scrambling keys to the descrambler 492. The CableCard 491 may also provide CC copy protected content to the descrambler.

The content items 438 from the MSO content management system 430 may also be DRM scrambled content, which is provided to the descrambler 492. The DRM License 432 includes the keys 436 used to scramble the content. The DRM License 432 may be delivered as a part of the content transport stream or independently delivered and associated with the content, e.g., through references in program event information. If passed through the CableCard, the MSO usage rules 434 for a piece of content are not interpreted by the CableCard and are available to the host 410 in the same manner as other information passing through the CableCard.

The DRM Client 412 combines the MSO usage rules 434 with user subscription 442 and service entitlement data and with device registration data 444 specific to the CPE 410 to generate an initial set of Content Usage Information 446. The device registration client 444 in the CPE device 410 also enables third party devices 474 to be registered. The user subscription and service entitlement data is retrieved from the User Domain Manager 422 of the MSO domain management service 420. The MSO User Subscription Registrar 424 obtains the user subscription from the billing system 428. The user subscription is authenticated by the MSO User Subscription Registrar 424 and securely delivered and stored in the CPE device 410. This information defines the user current set of service entitlements for the user and any pending changes to those entitlements, e.g., subscription expirations or pending service additions. The device registration data is obtained from the device characteristics database 429. The device registration data is authenticated by the MSO Device Registrar 426 and securely delivered and stored by the device registration client 444 in the CPE device 410. This information defines the devices that are associated with the user's domain (or domains) and the relationships between the user subscriptions and those devices, e.g., a device that is temporarily added to the domain in order to share content for a limit time period.

A single piece of content may need to have MSO usage rules that can be differentiated by the features available to the DRM Client 410 that interprets these rules. For example, different rules could be applicable to DRM Clients 410 that use a hardware based security container than those applicable to clients that use a software based security container.

The Content Usage Information 446 is initially generated by applying the MSO Usage Rules 434 against the restrictions defined in the user subscription(s) obtained from the user subscription client 442 and the devices registered to that user, which is obtained by the DRM manager 448 from the device registration client 444. As the content is consumed, output or propagated, the Content Usage Information is revised 450 to reflect the set of activities applied to that content and the revised CUI 450 is delivered with the content to managed devices 470, 472 in the managed domain that need to apply the updated CUI 450 to that content. For example, if there is a limit on the number of copies that can be made of the content, each request for a copy will be recorded at the original acquisition point and the revised CUI 450 passed to the sink device will indicate that only the number of copies requested can be made through that device.

Controls may be included in the CUI 450 to restrict usage of content within the DRM system. For example, such controls may include: (1) Copy and Movement control, (2) Consumption control, (3) Propagation control, (4) Output control, (5) Scrambling control, (6) Storage control, and (7) Transcoding control. The initial CUI 446 can be changed before it is passed to a consumption or export point. The following are examples of the changes that can occur:

The Copy Once flag is changed to Copy No More

If the Copy Never flag is set in the original CUI, the Copy Never Internal Retention Limit may be set in the revised CUI. This restricts the storage time of this content in a time shift buffer (or equivalent) and any time shift operations that need to exceed this limit would rely on the ability of the content source to provide that feature.

If the View Period is specified in the original CUI, this is replaced by a Viewing Window which specifies absolute dates.

The standard four CCI states, i.e., Copy Freely, Copy Once, Copy No More, and Copy Never, and the addition of the Copy Never Internal Retention Limit may be stored in the time shift buffer of the consuming system.

Consumption controls may be implemented to define whether and when the content can be viewed. For example, the viewable flag indicates whether the content is viewable. Content may be initially acquired with this flag set to false and the MSO Usage Rules later updated to indicate that the content is now viewable. The View Window describes the exact time period during which the content is viewable. This assumes that devices are able to synchronize time to a secure source. The CPE device 410 can provide this for attached devices, but remote and mobile devices need to have an independent source. The View Period describes the time period, e.g., in units of 15 minutes, from the time of first consumption of the content during which the content can be viewed. For example, a value of 672 would allow content to be viewed for seven days after first starting to view the content. The View Period is translated to a View Window for any export of the content to another managed device. The Simultaneous View Count limits the number of consumption points that can simultaneously view the content. This control is only effective during the content broadcast period and a new set of CUI is issued to any device that has stored the content at the end of that period.

Propagation Controls may be used to define the localities and domains to which the content can be moved or in which the content can be viewed. There are separate controls managing movement and viewing. For example, a control for content may be set to move or view the content in local proximity, irrespective of domain constraints, to move or view in local managed domain, to move or view in geographically restricted managed domains, to move or view in entire Managed domain, to move or view anywhere, etc. These controls require some means to securely define the locality of each device. This could be provided through Host Parameters managed from the cable headend for attached devices, but may also use a GPS or similar technology for remote and mobile devices.

Additionally, controls are provided that allow for the transition of move and view rules restricting content to a local or geographic domain to those restricting content to the entire trusted domain. These controls allow the content to be viewed in the entire trusted domain after a specific date and for this to be applied as either all content to be viewed immediately after that date or for there to be a moving window that restricts the portion of content that can be viewed after that date. For example, content that was delivered 20 minutes after the program started could be viewed 20 minutes after the specified date in the moving window scenario, or would be viewable immediately after the specified date if the moving window control is not activated.

Selectable output controls are also capable of being provided. For example, consumption may be allowed via analogue SD or via analogue HD. Control over the export and consumption to digital devices may also be provided. For examples, controls may be provided to allow export via IEEE 1394, DVI, HDMI, Ethernet, USB Connector, SATA, etc.

Controls for content that is to be exported outside of the managed domain may be configured to allow export to specific Digital Rights Management System that has a defined mapping for the MSO Usage Rules applied to managed content, to export to any DTCP/IP registered device, to export to any device, irrespective of the Digital Rights Management System or Copy Protection System used by that device (if any), to limit the resolution of analogue HD export and consumption to 520,000 pixels per frame, and to limit the consumption, storage or export of content to devices with specific characteristics. For example, the controls may only allow export to devices with a hardware based security container used by the sink device DRM Client.

The Content Usage Information includes a flag to indicate that the content does not need to be scrambled for consumption or export to other devices. The Content Usage Information also provides controls over the devices that can be used to store content within the Cox managed domain. For example, such controls may be configured to allow storage to DVD-R media, DVD-RAM media, DVD-RW media, DVD-VR format, HD-DVD, Blu-ray Disc, a local hard drive, an external hard drive, etc.

The Content Usage Information can also include a list of formats to which the content is allowed to be transcoded. The list could be supplied as either a set of allowable formats for transcoding or a set of disallowed formats. Separate lists can be supplied for each type of content; audio, video, still picture, etc.

When content is exported with DTCP/IP link-layer encryption only, no CUI information is supplied to the sink device. In this case the only controls that are available are through the EMI in the DTCP/IP packet protocol and the matching CCI bits in the content stream. The DTCP/IP enabled sink is required to manage the content according to these EMI and CCI bits as described in the DTCP/IP specifications.

As indicated above, the DRM system involves the registration of users (or subscribers) and of managed devices in a manner that securely creates associations between these entities to form domains within which items of content can be managed according to the MSO Usage Rules for that content.

In order to perform these management operations, each device needs to contain a private key and that key needs to be securely associated to the device. Similarly, each user needs to be issued with a private key and the key bound to the user. This public key infrastructure provides a framework that allows for the secure exchange of identity and other information between devices. The Certificate Authority provides the operational entity for the generation, authentication and distribution of "certificates" to users and to device manufacturers for insertion into the device's security container. The term "certificate" does not imply any particular structure beyond the association of a key to an entity and the authentication by the Certificate Authority of that association.

The implementation of the public key infrastructure may utilize a chain of keys originating from a self-authenticated root key with each key in the chain managed by a separate entity. The design of the public key infrastructure needs to take into account the security of each key in the chain and balance this against the cost of performing cryptographic operations in downstream devices.

The Certificate Authority will also be responsible for the management of key revocation, key renewal and for providing key status information necessary to advise other parties of these management changes. The Certificate Authority will ensure the security of the keys that it holds, preferably by storing these keys within the confines of a FIPS 140-2 Level 3 Hardware Security Module. Additionally, the Certificate Authority will operate according to a set of policies and practices laid out in the form specified in IETF RFC 3647.

The Certificate Authority needs to be permanently available to networked CPE devices that are running the DRM. The CPE acts as a proxy in provisioning information from the Certificate Authority to other devices. The mediation service 460 obtains encryption keys and required encryption algorithm from third party servers 462. While the Mediation Service 460 also needs to be permanently available to networked CPE devices, the functions of the Certificate Authority and the Mediation Service 460 are distinct and these can be provided by separate resources. The networked CPE devices only need to connect to the Certificate Authority or the Mediation Service 460 when it needs to use the services that they provide. The services need to be permanently available to the networked CPE device, but not permanently connected to the networked CPE device.

The Certificate Authority needs to generate keys and provide these to device manufacturers who will securely embed these keys into their devices and associate each key to a unique device identifier. There are a number of models that can be used to provide keys and capture the key to device associations; the set of models to be supported needs to be agreed with the CE community.

A single DRM Policy Engine is preferred for administering policies for all its devices across all its markets. The main role of the Policy Engine is the translation of business policy into content protection and rights management directives and the communication of such directives to all the DRM servers and all other servers associated with the content protection function. One of the policies that are required to be communicated is the determination of what types of content can be played, transferred or stored per device class. The device classification may start as a crude classification, such as whether a device is HD capable or contains a security processor, but may evolve with time to support more elaborate taxonomies to support new business models and content protection requirements imposed by content owners and industry organizations.

The DRM Network Handler 480 is envisioned to be an OCAP privileged application or native application that is provided by the DRM vendor and provides several basic functionalities. The DRM Network Handler 480 provides an application interface and a network interface. In order to implement new business models beyond Pay-Per-View (PPV) and encrypted Video-On-Demand (VOD), applications must be able to communicate with the DRM manager in a managed device. In order to allow applications to operate with a variety of DRM systems a set of standard Java interfaces needs to be defined for applications to communicate with the DRM manager.

The DRM Network Handler 480 provides an interface to applications 414 of the CPE device 410. In order for the CPE devices 410 to communicate with the DRM System, a new messaging protocol and set of data structures are defined. Some of the network information communicated over the DRMNH can relate network topology and communication protocols supported. Additionally, MSO Usage Rules policy directives including content rights mapping tables and transcription information can be communicated using the DRMNH interface.

CableLabs and the MSO community accept DTCP as an approved output for the secure distribution of content based on CCI. Thus, this functionality may be leveraged as part of the DRM overall architecture. While the DTLA licenses provide for the use of the DTCP/IP transport protocol, the license agreement includes higher layer requirements and robustness rules for the client or device that is making use of DTCP/IP. For example, The DTLA license places requirements on approved encryption methods for the storage of content, rules for moving "copy no more" content, and provides a set allowable retention values that can be associated with content. As such, DTCP/IP may be used as a potential first phase content protection approach for IP devices. More robust DRM technologies may not be required until such time that supported business models require content usage rules that are beyond the capabilities of DTCP/IP.

A Host device in the managed domain supports an OCAP stack and provides the ability to run OCAP applications. Other CPE devices in the managed domain may also be OCAP enabled, but it should not be assumed that all devices will be capable of running OCAP. It may be possible for part or the entire DRM Client running within a managed device to be installed as an OCAP application. Vendors should consider whether this would be advantageous for their system and indicate any necessary extensions to OCAP to support their proposed solution.

There are a number of standards initiatives that are currently addressing aspects of content protection and digital rights management within the home network. These include CableLabs development of Home Networking and Home Networking Security specification, CableLabs development of a Digital Rights Interface and the Bi-directional Open-Cable Receiver specification, and ATIS enhancements to the CableCard interface specifications to carry enhanced CI and other content protection information. The development of the DRM system recognizes and, where necessary co-operates with these standards initiatives to develop a cohesive solution. It is expected that parts of the DRM system will lead to enhancements to current standards or the development of new standards under the auspices of one of the current cable industry standards development bodies.

Figure 5:
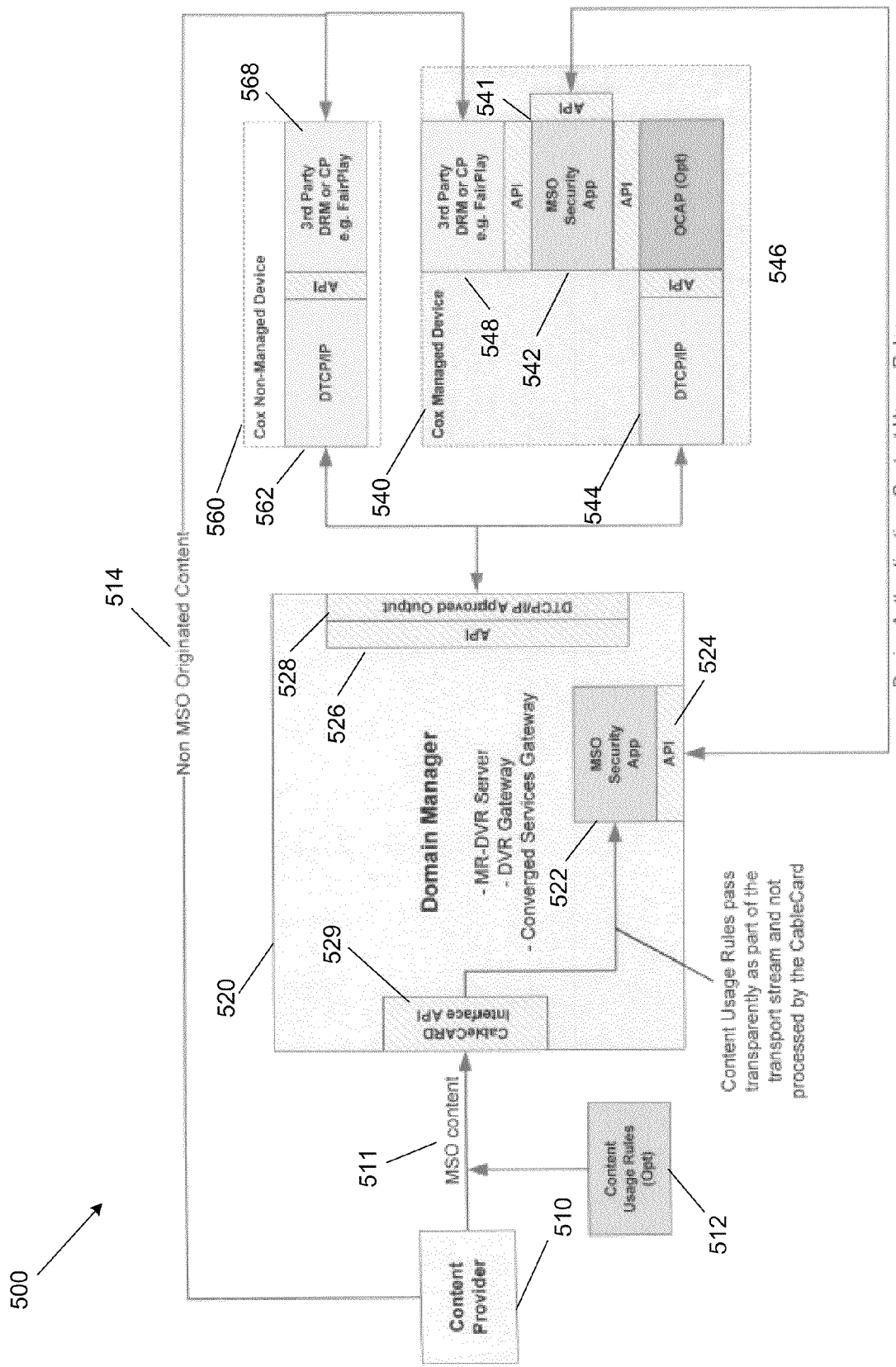
FIG. 5 illustrates a DRM bridge implemented without the mediation service according to an embodiment of the invention.

FIG. 5 illustrates a DRM bridge implemented without the mediation service 500 according to an embodiment of the invention. In FIG. 5, the client 540 uses the system operator's preferred DRM 542 and associated API 541 so there is no need to bridge it. Content in the operator system is protected by copy control information (CCI). Copy control information may be implemented using two bits of control. Two bits provide four states, i.e., copy freely, copy one time, copy no more and copy never. For example, content sent from HBO is identified as copy never. Broadcasts off the air are not allowed to be encrypted by the system operator, so that content is identified as copy free.

When content comes from the content provider 510, usage rules 512 may be applied to the MSO content 511. The domain manager 520 receives the MSO content 511 via a CableCard interface API 529. The domain manager 520 may be a multi-room DVR server, a DVR gateway, a complex multi-room DVR, a gateway that is a combination of a set-top box with access cable modem, etc. The domain manager 520 also has a MSO security application 522 and associated API 524. The MSO security application 522 is the DRM client. The domain manger 520 also has an API 526 for a DTCP over IP approved output 528. DTCP over IP is an approved output for an OpenCable device to a Tru2Way device for exporting content. DTCP 528 provides the link protection. DTCP 528 provides encryption from the server or source 520 to a client 540, 560 and specifies encryption and copy control information. Thus, the domain manager 520 is coupled to devices 540, 560 that are receiving transferred content.

Non-managed device 560 does not have the MSO security application 542. The non-managed device 560 may not be running the DRM user interface, but does include DTCP over IP 562. Therefore, according to the BTLA license, the non-managed device 560 must be able to receive some content, e.g., not the most recent releases and sophisticated subscriber packages, but some content. The managed device 540 is running the security DRM application client 562 and communicates with the MSO security application 522 in the domain manager 520. Accordingly, DRM is instantiated as an overlay on top of DTCP. A client 522 is provided in the gateway 520 and a client 542 is provided in the device 540. The managed device 540 also includes a DCTP over IP client 544. The managed device 540 supports an OCAP stack 546 that provides the ability to run OCAP applications.

Thus, a DTCP source 528 uses a very basic set of copy control information that is overlaid by the DRM content protection structure control plane thereby providing two control planes, i.e., DTCP source to sync and DTCP taking information from a DRM manager 520. Thus, the DTCP agent 544 in the client communicates with the DRM MSO security application 542.

MSO content 511 coming from a content provider 510 could be configured with both CCI and DRM metadata from the system operator. The DRM manager 522 and the domain manager 520 may provide the transcription from CCI to the preferred DRM or vice versa. The option is available to perform a direct mapping or an enhanced mapping where content has CCI as well as the additional control that might dictate what can be done with the content. The content goes through the domain manager 520, the client 540 requests the content, there is a negotiation between server source 520 and client 540 at the DTCP level 544/528. On top of that, there is also an authentication between the MSO security application 542 of the client 540 and the MSO security application 522 of the server 520. Thus, there might be a lower level of DTCP authentication applications 544, 528 and a higher level authentication between DRM MSO security applications 522, 542. Some content will flow to the non-managed device 560 based strictly on CCI. However, some of the content that flows that way may not be readable because it may be protected additionally by the DRM plane provided by the device manager 520. For example, metadata may be encrypted so even after DTCP over IP decryption is performed, there is still another layer of encryption that can only be resolved by a DRM client, i.e., 542. These parameters may all be set by policy.

If devices 540, 560 having a specific third party DRM right 548, 568 is requesting content, the devices is able to join the basic home network and it is able to see some content. Thus, the system operator does not need to have a specific business arrangement with every third party content providers. Rather, the content providers all subscribe to a third party DRM. The content provider 510 also provides non-MSO originated content 514 to devices 540, 560.

Referring to FIG. 5, the content usage information and the MSO usage rules will be explained. A user 540 agrees to service subscription with the MSO 510. The MSO securely sends subscription license to a Host device 520 of the user. The MSO 510 delivers to the user 540 a content stream and associated MSO usage rules, either via broadcast service or unicast service scenarios. Host device 520 examines the MSO usage rules and the user subscription license. In this example the MSO usage rules limit the content of storage to a single copy within the user's managed local domain for a period of seven days. The Host device 520 identifies the set of devices in the domain that can store the content and generates initial Content Usage Information that describes the restrictions and also the reevaluation time for this Content Usage Information. The reevaluation time would normally be the seven day period, but in the case that the subscription of the user 540 needs to be renewed within that period would be shorter. If the user 540 decides to store the content on a device 540 within the local domain other than the Host device 520, a new set of Content Usage Information would be created for that device 540 and the initial set of Content Usage Information on the Host device 520 would be updated. The CUI on the Host device 520 would identify the device 540 on which the content is stored and would prohibit the generation of a further copy. The CUI on the storing device 540 would prohibit the generation of a further copy and would require that device to verify its locality to the Host device 520 before moving its copy to a different device in the same locality. The CUI on the target device 540 should never be less restrictive than the CUI on the Host device 520 that receives the content. The CUI on the Host device 520 would be updated in the case that new devices were registered into the managed domain, allowing those devices to become available to store the restricted content. The initial CUI on the Host device 520 would also be updated in the case that the user 540 renewed its service subscription. The CUI on the Host device 520 would be updated at the end of the restricted period defined in the MSO usage rules. This could either remove the restrictions on the storage of the content or could slacken the initial set of restrictions, for example by allowing the single copy to be stored on a remote or mobile device. The CUI on the storage device 540 would be checked and possibly updated when the content is accessed and that storage device 540 is connected to the Host device 520. The CUI on the storage device 540 can be deleted once the information is no longer needed, for example, when the content is deleted from the device or the restriction periods have expired. The CUI on the Host device 520 can be deleted once the information is no longer needed or can be accurately reconstructed from the MSO usage rules bound to the content and the current user subscription status and domain information.

Figure 6:
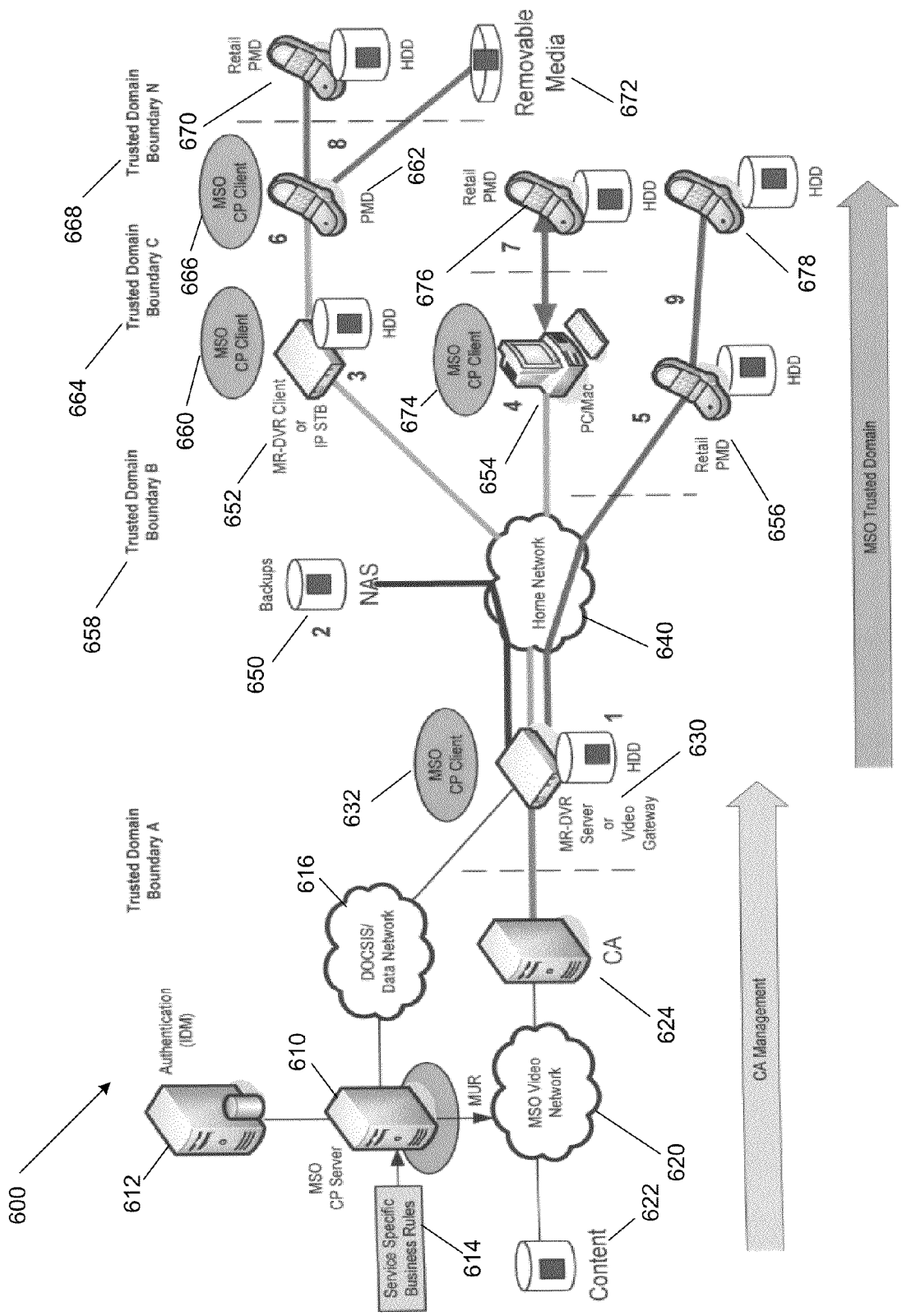
FIG. 6 is a diagram showing the components of a network having conditional access and MSO trusted domains according to an embodiment of the invention.

FIG. 6 is a diagram showing the components of a network 600 having conditional access and MSO trusted domains according to an embodiment of the invention. In FIG. 6, an MSO CP server 610 is coupled to an authentication server 612. In addition, service specific business rules 614 are provided to the MSO CP server 610. The MSO CP server 610 provides Internet and other data service to MR-DVR server or video gateway 630 via DOCSIS/data network 616. The MSO CP server 610 provides user rules to the MSO video network 620, which may be applied to content 622. A conditional access server 624 receives the content with the user rules, which is then provided to MR-DVR server/video gateway 630. The MR-DVR server/video gateway 630 includes a MSO CP client 632.

The MR-DVR server/video gateway 630 provides content to the home network 640, which is then routed to devices in the MSO trusted domain 642. The MSO trusted domain 642 includes backup storage 650, a MR-DVR client/IP STB 652, a computer 654, and a retail personal media device 656 in trusted domain B 658. The MR-DVR client/IP STB 652 includes a MSO CP client 660 and is coupled to personal media device 662 in trusted domain C 664. The personal media device 662 in trusted domain C 664 also includes a MSO CP client 666. The personal media device 662 in trusted domain C 664 is coupled, in trusted domain N 668, to a retail personal media device 670 and removable media 672.

The computer 654 in trusted domain B 658 includes a MSO CP client 674 and is coupled to a retail personal media device 676 in trusted domain C 664. The retail personal media device 656 in trusted domain B 658 does not include a MSO CP client, but is coupled to retail media device 678 in trusted domain C 664.

Figure 7:
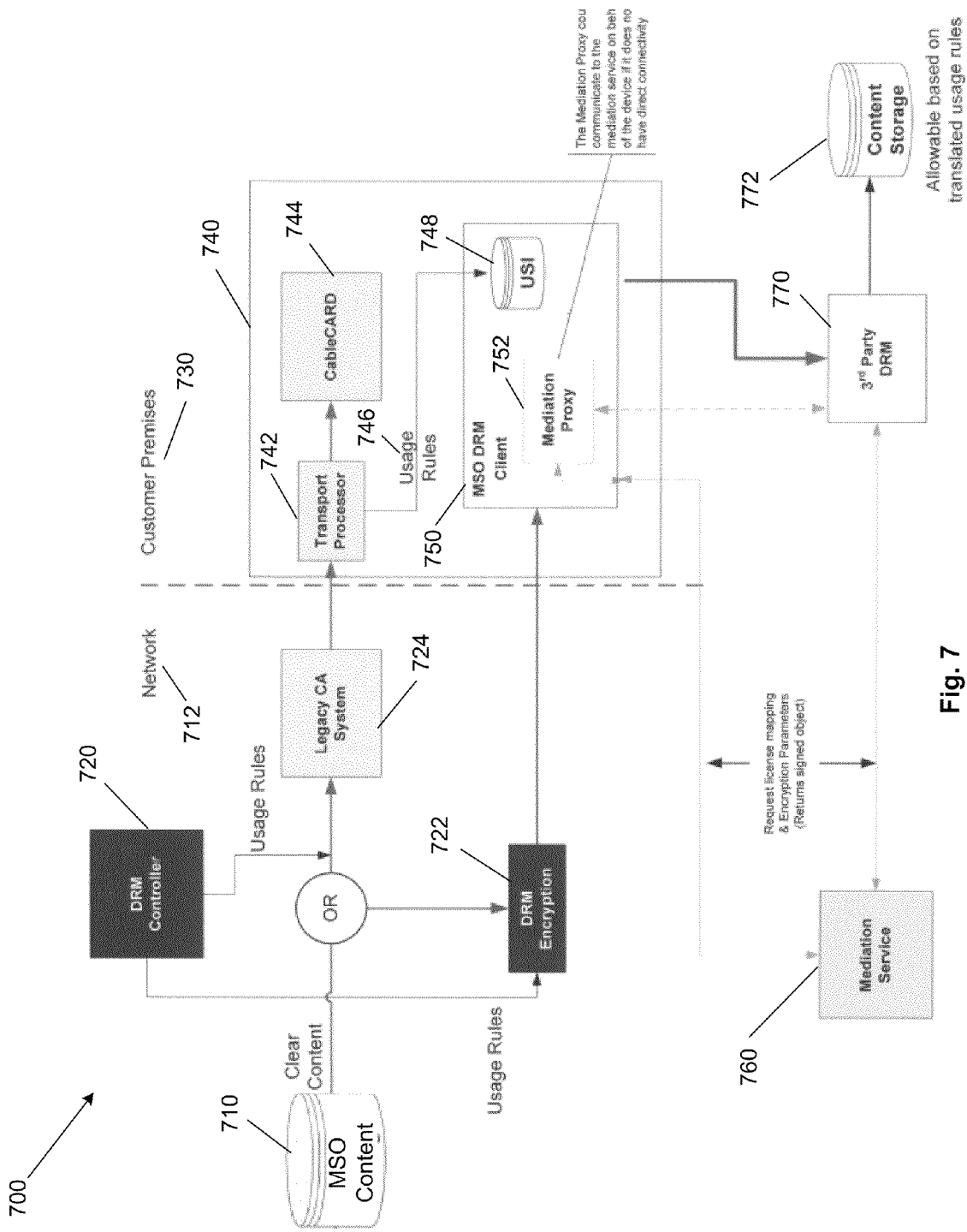
FIG. 7 illustrates a flow diagram for DMR bridging using mediation services according to an embodiment of the invention.

FIG. 7 illustrates a flow diagram 700 for DMR bridging using mediation services according to an embodiment of the invention. In FIG. 7, MSO content 710 is provided on the network side 712. A DRM controller 720 provides usage rules for encryption of content by DRM encryption 722 and usage rules that are applied to content routed to legacy CA system 724.

At the customer premises 730, the CPE device 740 includes a transport processor 742 that receives the CA content. A CableCard 744 descrambles the content and usage rules 746 are provided to USI 748 in MSO DRM client 750. MSO DRM client 750 also includes a mediation proxy 752 communicates to the mediation services 760 on behalf of the CPE device 740. The mediation services 760 provide license mapping and encryption parameters to the mediation proxy 752 in the MSO DRM client 750. The MSO DRM client 750 is also coupled to third party DRM 770. The third party DRM 770 stores content in content storage device 772 based on the translated usage rules.

Figure 8:
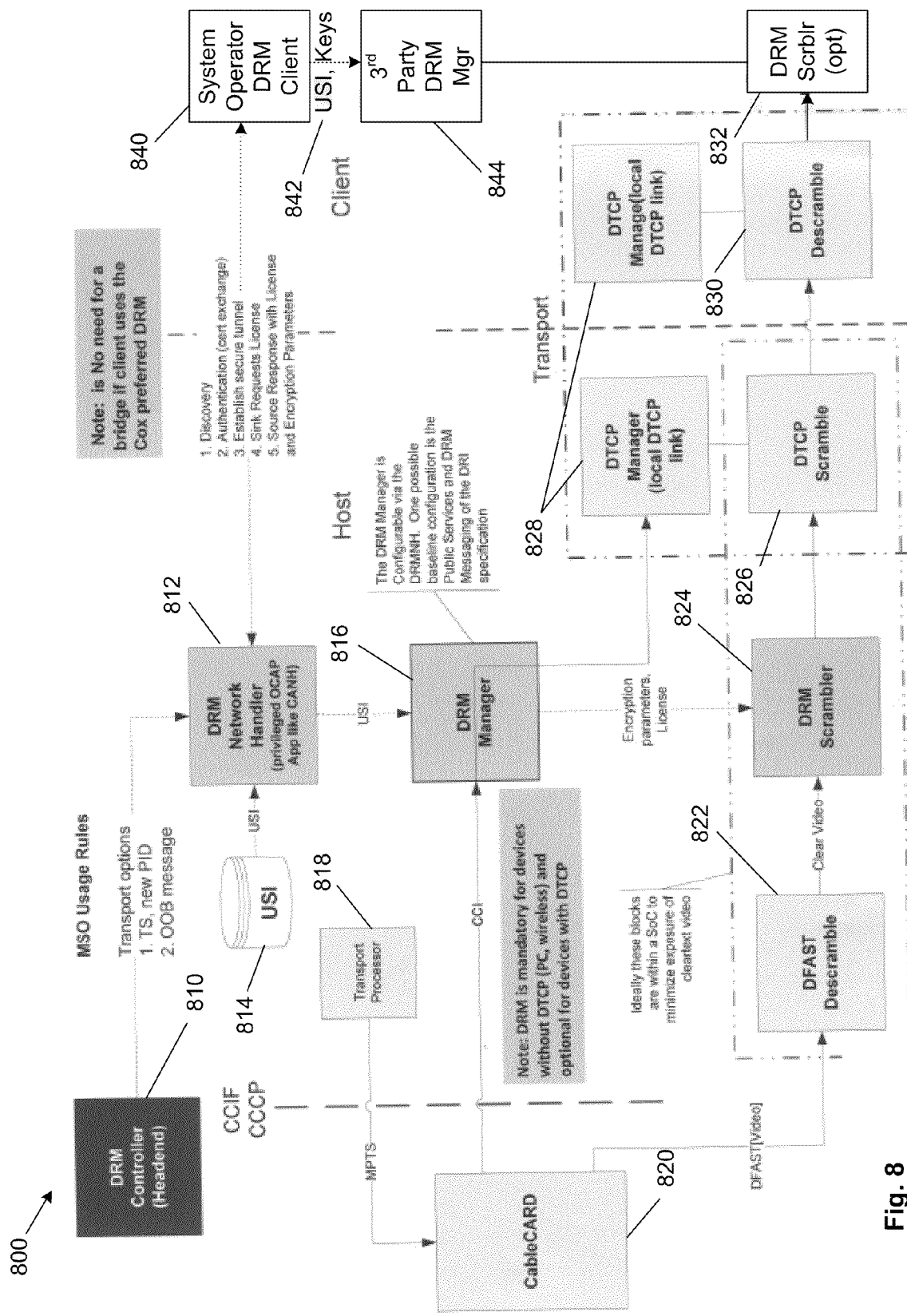
FIG. 8 is a block diagram of a device for processing DRM content according to an embodiment of the invention.

FIG. 8 is a block diagram of a device for processing DRM content 800 according to an embodiment of the invention. In FIG. 8, a DRM controller 810 at a headend provides the device 800 with DRM content. A DRM network handler 812 receives the content and usage state information from USI server 814. The USI is provided from the DRM network handler 812 to DRM manager 816. The DRM network handler 812 is also coupled to the system operator DRM client 840. The system operator DRM client 840 provides the USI and keys 842 to a third party DRM manager 844.

Transport processor 818 provides a multiple program transport stream (MPTS) to CableCard 820. The CableCard 820 provides Copy Control Information (CCI) to DRM manager 816. CableCard 820 also provides encrypted video to descrambler 822. The descrambler provides clear video to DRM scrambler 824. DRM scrambler 824 receives encryption parameters and license from DRM manager 816 and scrambles the clear content using the encryption parameters and license from DRM manager 816.

The DTCP scrambler 826 receives the signal fro the DRM scrambler 824. The DRM manager 816 provides the CCI to the DTCP manager 828. The DTCP manager 828 provides the necessary information for DTCP scrambler 826 to apply DTCP to the content. A DTCP descrambler 830 descrambles the signal from the DTCP scrambler 826 on the client side. An optional DRM scrambler 832 may be coupled to the DTCP descrambler 830.

Figure 9:
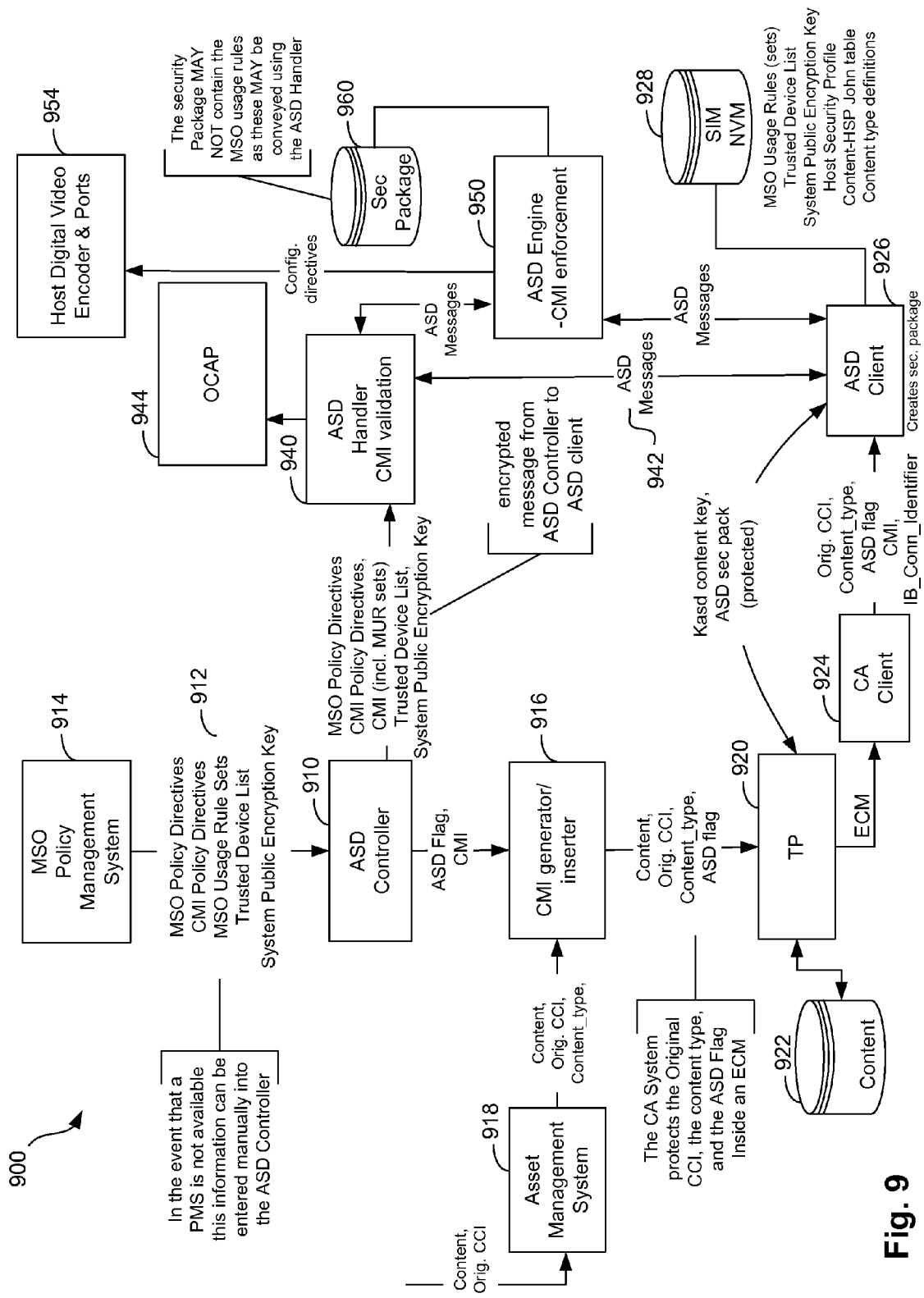
FIG. 9 is a block diagram of an authorized service domain (ASD) for trusted device according to an embodiment of the invention.

FIG. 9 is a block diagram of an authorized service domain (ASD) for trusted device 900 according to an embodiment of the invention. In FIG. 9, an ASD controller 910 receives information 912, e.g., MSO policy directives, CM policy directives, MSO usage rules, trusted device list and system public encryption keys, from a MSO policy management system 914. A CMI generator/inserter 916 receives ASD flag and CMI from ASD controller 910. CMI generator/inserter 916 also receives content, original CCI and content type from an asset management system 918. Transport processor 920 receives content, the original CCI, content type, and the ASD flag from the CMI generator/inserter 916. Additional content 922 may be provided to the transport processor 920. The transport processor 920 is coupled to a CA client 924. The CA client 924 provides the original CCI, the content type, the ASD flag, the CMI and the IB Connector Identifier to an ASD client 926. The ASD client 926 and the transport processor 920 exchange KASD content key and the ASD security pack. The ASD client 926 is coupled to non-volatile storage 928. Non-volatile storage 928 may store the MSO usage rule sets, the trusted device list, the system public encryption key, the host security profile, the content-HSP join table and the content type definitions.

The ASD controller 910 also provides the information 912, e.g., MSO policy directives, CM policy directives, MSO usage rules, trusted device list and system public encryption keys, to ASD handler 940, which provides CMI validation. ASD handler 940 and ASD client 926 exchange ASD messages 942. ASD handler 940 is also coupled to OCAP 944 to provide the API extensions.

ASD engine 950 provides CMI enforcement while exchanging ASD messages with ASD handler 940 and ASD client 926. ASD engine 950 also provides the Host Digital Video Encoder and Ports 952 with configuration directives 954. Storage 960 may be used to store the security package for ASD engine 950. However, the security package maintained at storage 960 may not contain the MSO usage rules. Rather, these may be conveyed using the ASD handler 940.

Figure 10:
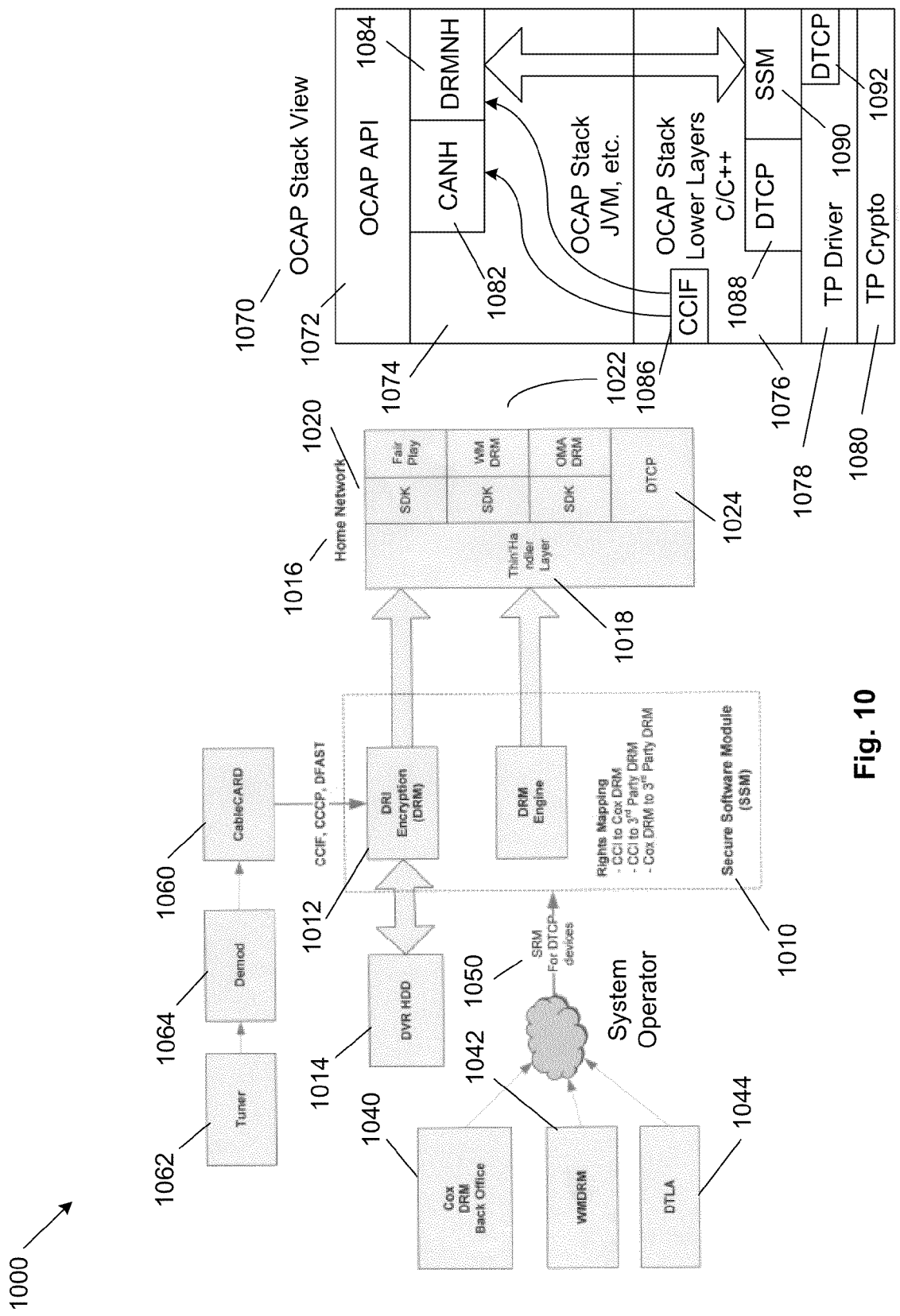
FIG. 10 illustrates a DRM flow overview according to an embodiment of the invention.

FIG. 10 illustrates a DRM flow overview 1000 according to an embodiment of the invention. In FIG. 10, a secure software module 1010 includes a DRI encryption (DRM) 1012 and DRM engine 1014. DRI encryption (DRM) 1012 is coupled to DVR hard disk drive (HDD) 1014. DRI encryption (DRM) 1012 and DRM engine 1014 are coupled to the home network 1016. The home network 1016 includes a thin handler layer 1018. The thin handler layer 1018 interfaces with the SDKs 1020 and various DRM technologies 1022. DTCP 1024 is implemented to enable content transfer between trusted devices.

The system operator provides a DRM backoffice 1040, WM DRM 1042 and DTLA 1044. The system operator provides secure removable media (SRM) functionality 1050 for DTCP devices. The secure software module also receives CCIF, CableCard Copy Protection (CCCP), DFAST from CableCard 1060. DFAST allows the CableCard 1060 to derive the same cryptography key without transmitting the key over the interface. At least one tuner 1062 and at least one demodulator 1064 are coupled to the CableCard 1060.

An OCAP stack 1070 is also shown in FIG. 10. The OCAP stack 1070 includes an OCAP API 1072, an OCAP stack Java Virtual Machine (JVM) 1074, OCAP stack lower layers 1076, TP driver 1078 and TP crypto 1080. The OCAP stack Java Virtual Machine (JVM) 1074 includes a conditional access network handler 1082 and a DRM network handler 1084. A CableCard Interface 1086 communicates with the conditional access network handler 1082 and the DRM network handler 1084. The OCAP stack lower layers 1076 include DTCP interface 1088 and source specific multicast interface (SSM) 1090. The TP driver 1078 includes a DTCP interface 1092. Further, the SSM 1090 and the DRM network handler 1084 exchange messages directly.

Figure 11:
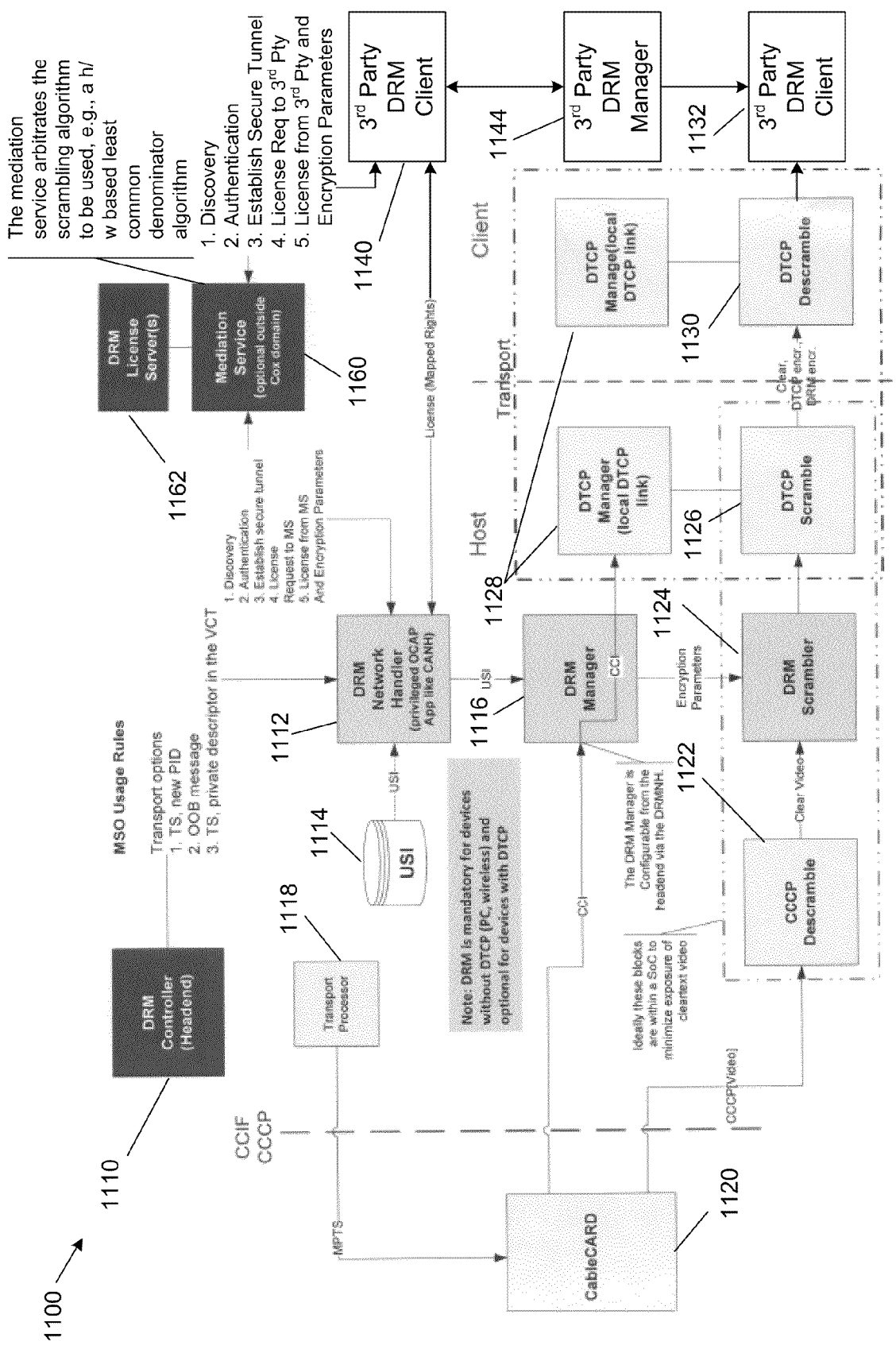
FIG. 11 is a block diagram of a device for processing DRM content using mediation services according to an embodiment of the invention.

FIG. 11 is a block diagram of a device for processing DRM content 1100 using mediation services according to an embodiment of the invention. In FIG. 11, a DRM controller 1110 at a headend provides the device 1100 with DRM content. A DRM network handler 1112 receives the content and usage state information from USI server 1114. The USI is provided from the DRM network handler 1112 to DRM manager 1116.

Transport processor 1118 provides a multiple program transport stream (MPTS) to CableCard 1120. The CableCard 1120 provides Copy Control Information (CCI) to DRM manager 1116. CableCard 1120 also provides encrypted video to descrambler 1122. The descrambler provides clear video to DRM scrambler 1124. DRM scrambler 1124 receives encryption parameters and license from DRM manager 1116 and scrambles the clear content using the encryption parameters and license from DRM manager 1116.

The DTCP scrambler 1126 receives the signal fro the DRM scrambler 1124. The DRM manager 1116 provides the CCI to the DTCP manager 1128. The DTCP manager 1128 provides the necessary information for DTCP scrambler 1126 to apply DTCP to the content. A DTCP descrambler 1130 descrambles the signal from the DTCP scrambler 1126 on the client side. An optional DRM scrambler 1132 may be coupled to the DTCP descrambler 1130.

The DRM network handler 1112 is also coupled to a third party DRM client 1140. The third party DRM client 1140 is coupled to a third party DRM manager 1144. Mediation services 1160 enables discovery, performs authentication, establishes a secure tunnel, provides license requests to third parties, receives licenses and encryption parameters from third parties. The mediation service arbitrates the scrambling algorithm to be used, e.g., a h/w based least common denominator algorithm. A DRM license server 1062 is coupled to the mediation services 1060. The DRM network handler 1112 and the third party DRM client 1140 exchange license information to facilitate the mapping of rights. The mediation service 1160 maps the rights expressed in MSO usage rules and the CUI into a license that is suitable for use with third party DRM. The specifics of this mapping are dictated by each third party DRM vendor or by a commonly agreed service. The DRM license generated by the mediation service 1060 will only include the restricted set of rights that can be mapped into the terms of the DRM license applicable to the third party DRM.

The DRM technology and processes discussed above enables use cases as will be described below. Some of the use cases refer to Selectable Output Controls, MSO Usage Rules or DRM Licenses. It is assumed that, for broadcast content, these artifacts will be delivered with the content stream and assessed in the Host or networked CPE device to determine the allowable set of actions for that content stream according to the DRM compliance and robustness rules. The method of delivery to the Host should not rely on CableCard features or added functionality.

Figure 12:
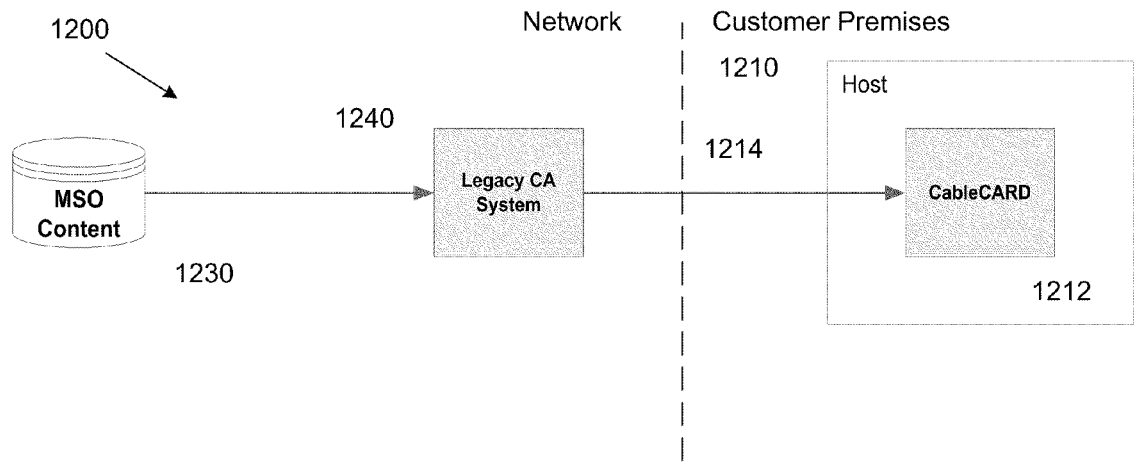
FIG. 12 illustrates acquisition of managed content under the control of a conditional access system according to an embodiment of the invention.

FIG. 12 illustrates acquisition of managed content under the control of a conditional access system 1200 according to an embodiment of the invention. The enforcement point for CA in the Host 1210 is the CableCard 1212. The acquisition of managed content 1230 under the control of a conditional access system 1200 is accessed through the CableCard 1212. MSO Content 1230, containing the CCI byte that describes the limitations on the use of that content, is provided via the legacy CA system 1240 to the CableCard 1212 via the cable connection 1214. Content may be scrambled using the proprietary CA System in force at the headend.

If necessary, content is descrambled by the CableCard 1212. Copy protected content is forwarded to the receiver in a scrambled format proprietary to the CableCard operator. The CCI information is forwarded to the Host according to the CCIF messaging protocol. Content may be descrambled by the transport processor in the Host for rendering to the viewer or captured to a local storage device for later consumption.

Figure 13:
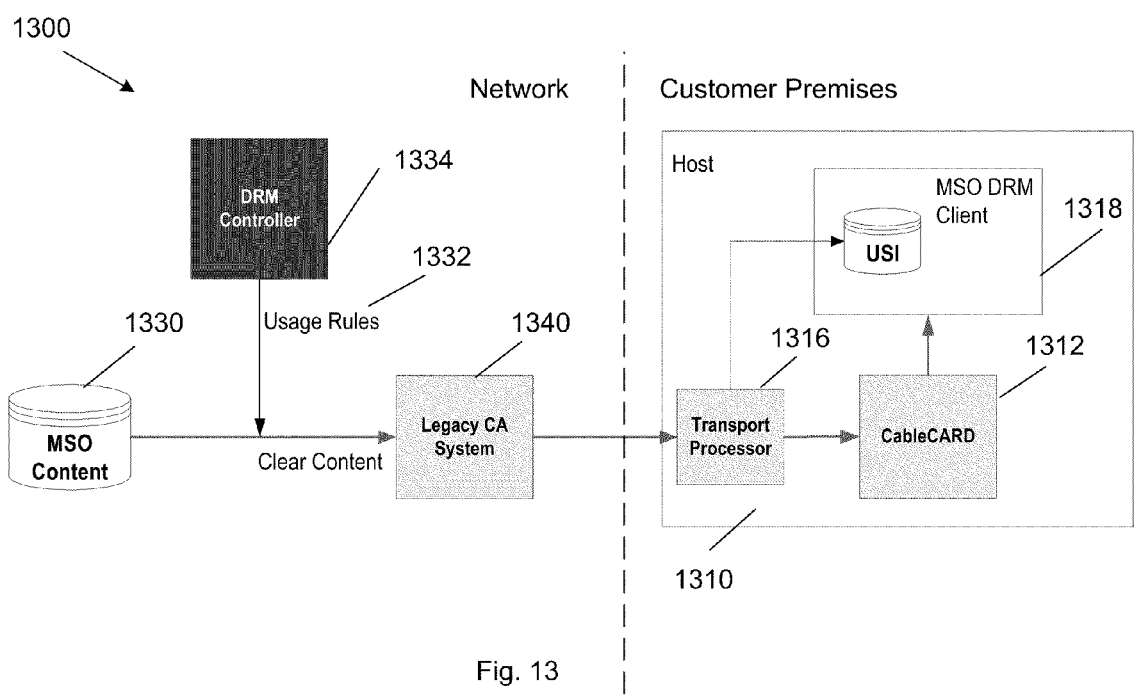
FIG. 13 illustrates acquisition of managed content under the control of a conditional access system with MSO usage rules according to an embodiment of the invention.

FIG. 13 illustrates acquisition of managed content under the control of a conditional access system with MSO usage rules 1300 according to an embodiment of the invention. In FIG. 13, MSO content 1330 is delivered to the legacy CA system 1340. MSO usage rules 1332 are provided by DRM controller 1334. The MSO usage rules 1332 provide control beyond the CCI byte included with the content stream.

The MSO Content 1330 and MSO usage rules 1332 are provided to Host 1310 via the CableCard 1312. Content may be scrambled using the proprietary CA System in force at the headend. If necessary, content is descrambled by the CableCard. The CCI information is forwarded to the Host 1310 according to the CCIF messaging protocol. The Host 1310 includes an MSO DRM client 1318 for extracting the MSO usage rules 1332 from the content. Content Usage Information is provided to the USI database 1319. If allowable by the MSO usage rules 1332, the content may be descrambled by the transport processor 1316 in the Host 1310 for rendering to the viewer or captured to a local storage device (not shown) for later consumption.

Figure 14:
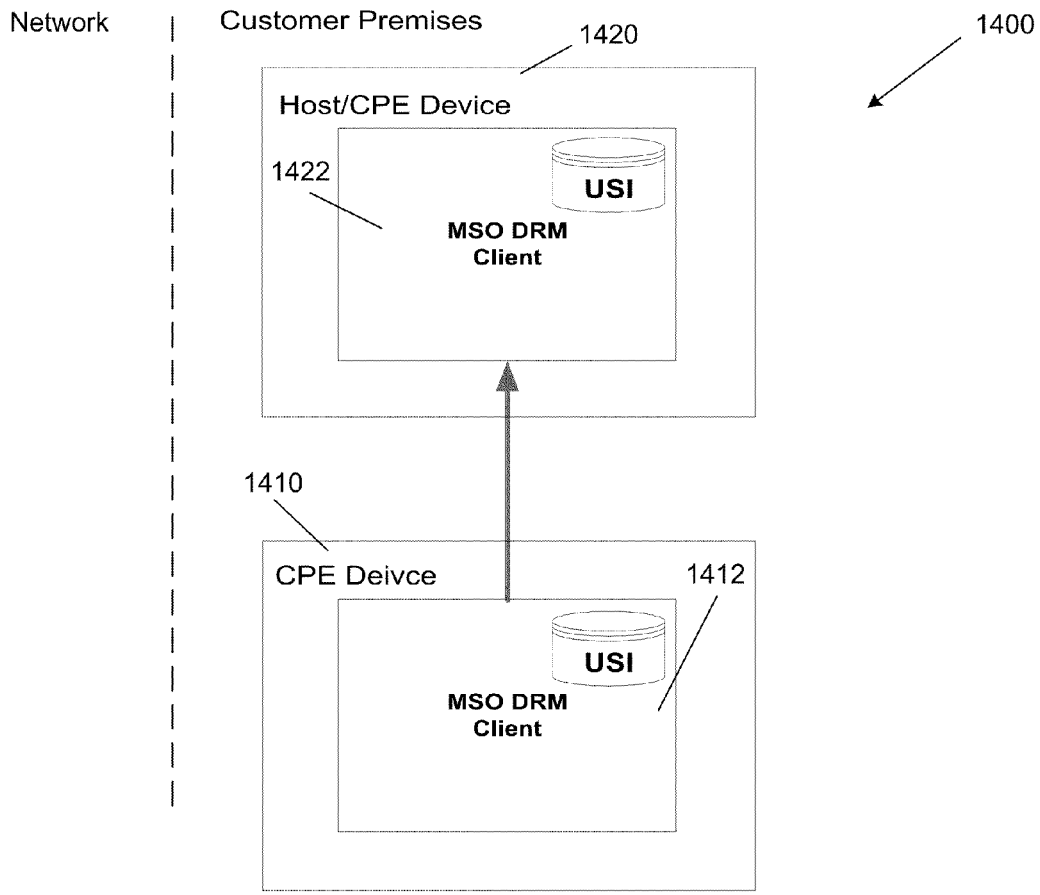
FIG. 14 illustrates acquisition of DRM content from within a managed domain according to an embodiment of the invention.

FIG. 14 illustrates acquisition of DRM content from within a managed domain 1400 according to an embodiment of the invention. The acquisition of DRM content illustrated in FIG. 14 applies to content outside the control of a conditional access system. In FIG. 14, the content is acquired within the managed security domain, either within the home network or directly from the headend with only DRM protection and usage rules and without CA content protection. More specifically, in FIG. 14, the content has been acquired by devices that are registered as part of the managed domain. All transfers in this use case are between devices within the managed domain.

A user registers a device into a home network domain. This process involves, at least, the addition of a device identity to the domain and may involve the evaluation of security information installed in the device or the supply of new security information to the device. A user acquires content with usage rights controlled within the managed domain. For example, the user may have set up a subscription service that allows download of previously broadcast content or may have entered into a VoD transaction for IP download to its portable video player.

The scrambled content is supplied with a managed DRM license that expresses the usage rights for that content and limits the transfer of that content to other devices in the managed home network domain. The content is descrambled by the device in the home network where it is being rendered. The descrambling information is contained in the DRM license and is understood by devices registered to the users managed home network domain.

Thus, in FIG. 14, content from CPE device 1410 may be transferred to Host/CPE device 1420. The MSO DRM client 1412 in CPE device 1410 works with the MSO DRM client 1422 in CPE device 1420 to complete the transfer of the content.

Figure 15:
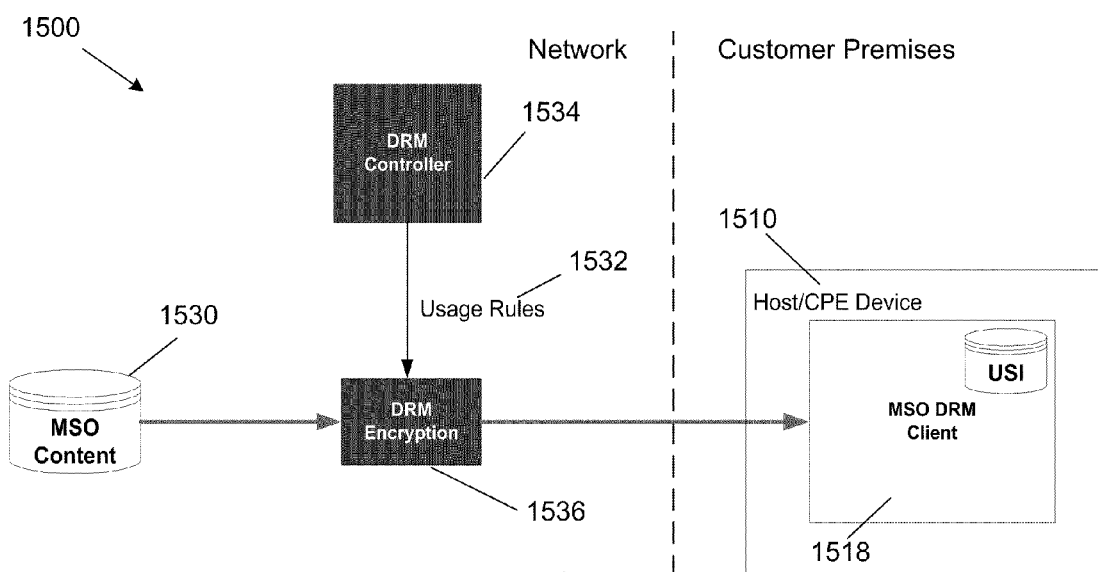
FIG. 15 illustrates the acquisition of content from the network according to an embodiment of the invention.

FIG. 15 illustrates the acquisition of content from the network 1500 according to an embodiment of the invention. In FIG. 15, the MSO content 1530 is delivered to the host/CPE device 1510 with only DRM protection. The DRM controller 1534 provides MSO usage rules 1532 that are delivered with the MSO content 1530. The MSO usage rules 1532 describe both the copy controls to be applied to the MSO content 1530 and the additional rules for content management as required by the DRM system.

The DRM encryption 1536 and the Host/CPE device 1510 perform the necessary key exchange protocols to enable content descrambling and MSO usage rule authentication. Content 1530 may be scrambled using the DRM encryption 1536 in force at the headend. Additional MSO usage rules, which may be supplied through other transport mechanisms, may also be used to govern the consumption, storage, processing and export of this content. DRM protected content is forwarded to the Host/CPE device 1510 in a scrambled format.

The Host/CPE device 1510 includes a MSO DRM client 1518 and extracts the MSO usage rules 1532 and the CCI from the content and generates Content Usage Information appropriate to this content. If allowable by the MSO usage rules 1532, the content may be descrambled by the Host/CPE device 1510 for rendering to the viewer or captured to a local storage device for later consumption.

Figure 16:
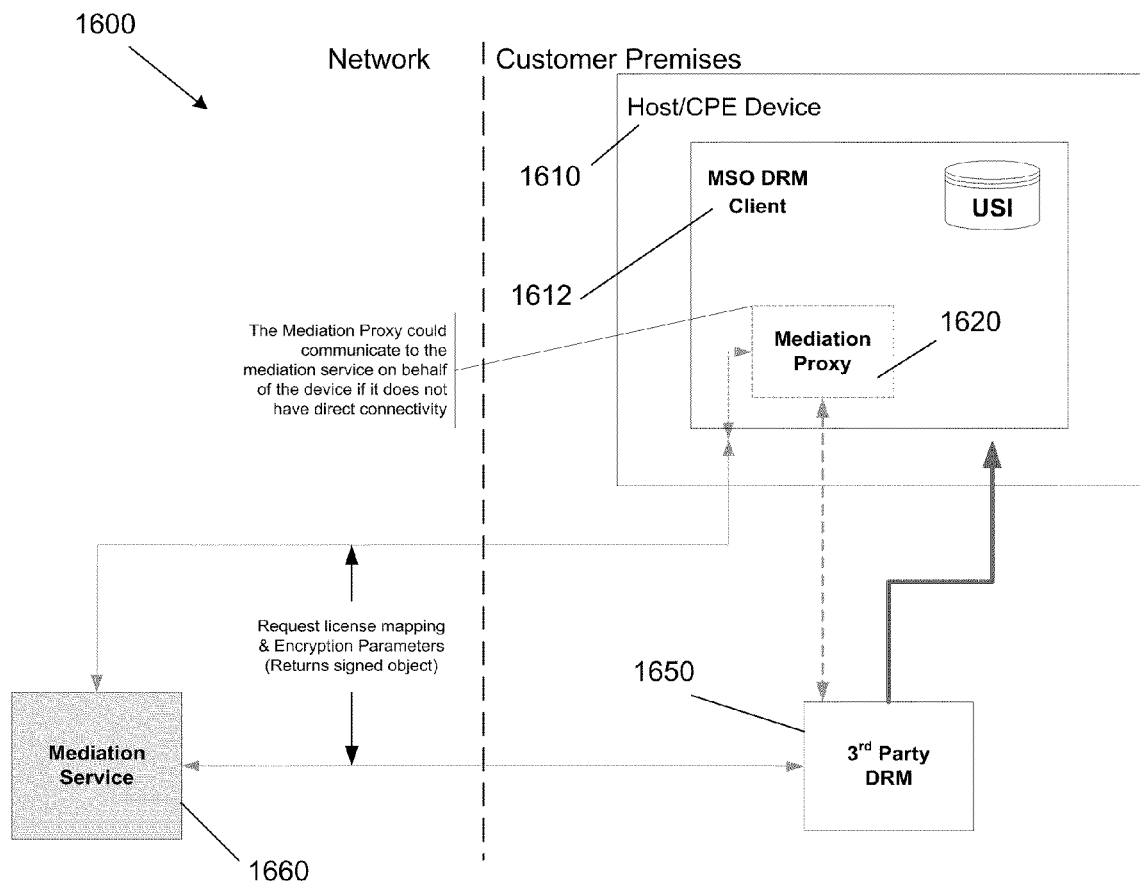
FIG. 16 illustrates acquisition of content from a third party domain according to an embodiment of the invention.

FIG. 16 illustrates acquisition of content from a third party domain 1600 according to an embodiment of the invention. Content may be acquired from devices that are registered to a domain under the control of a third party managed DRM, e.g., FairPlay, WMDRM, etc. In FIG. 16, a user makes a request to transfer rights from the third party managed DRM 1650 to the managed DRM provided through the MSO DRM client 1612 in the Host/CPE device 1610.

The third party managed DRM 1650 contacts a mediation service 1660 to conduct license negotiation and provides details of the current content format and its format processing capabilities. This request may relate to individual pieces of content, or to all content licensed to the requesting user, and may be time limited to allow temporary acquisition and consumption in the managed domain.

The mediation service 1660 requests details from the mediation proxy 1620 provided in the MSO DRM client 1612. The mediation service 1660 negotiates any required content format changes with the third party device 1650. The mediation service 1660 also negotiates the key exchange mechanism and content scrambling algorithm to be used by the third party DRM device 1650 and the Host/CPE device 1610.

The mediation service 1660 creates a new license for the third party DRM by adjusting the rights to take into account the transfer of content into the managed domain of the Host/CPE device 1610 and provides a new license for the managed domain.

The mediation service 1660 instructs the third party device 1650 currently holding the scrambled content to translate the content format to one that is acceptable within the managed domain. This may involve a change of scrambling algorithm or down-res of the content or a complete change of audio format, e.g., MP3 to AAC.

The third party device 1650 currently holding the scrambled content conducts a content scrambling key exchange with the Host/CPE device 1610. The third party device 1650 currently holding the scrambled content initiates the acquisition of content by the Host/CPE device 1610 by forwarding the DRM license for the domain of the Host/CPE device 1610 to the Host/CPE device 1610.

The Host/CPE device 1610 acquires the scrambled content from the third party device 1650 according to the instructions delivered with the DRM license and manages the content according to the usage rules defined in that license. In the case that one of the two devices does not have direct connectivity, the other device may proxy requests to the mediation service 1660. These messages will be authenticated such that the proxy can not modify the message content.

Figure 17:
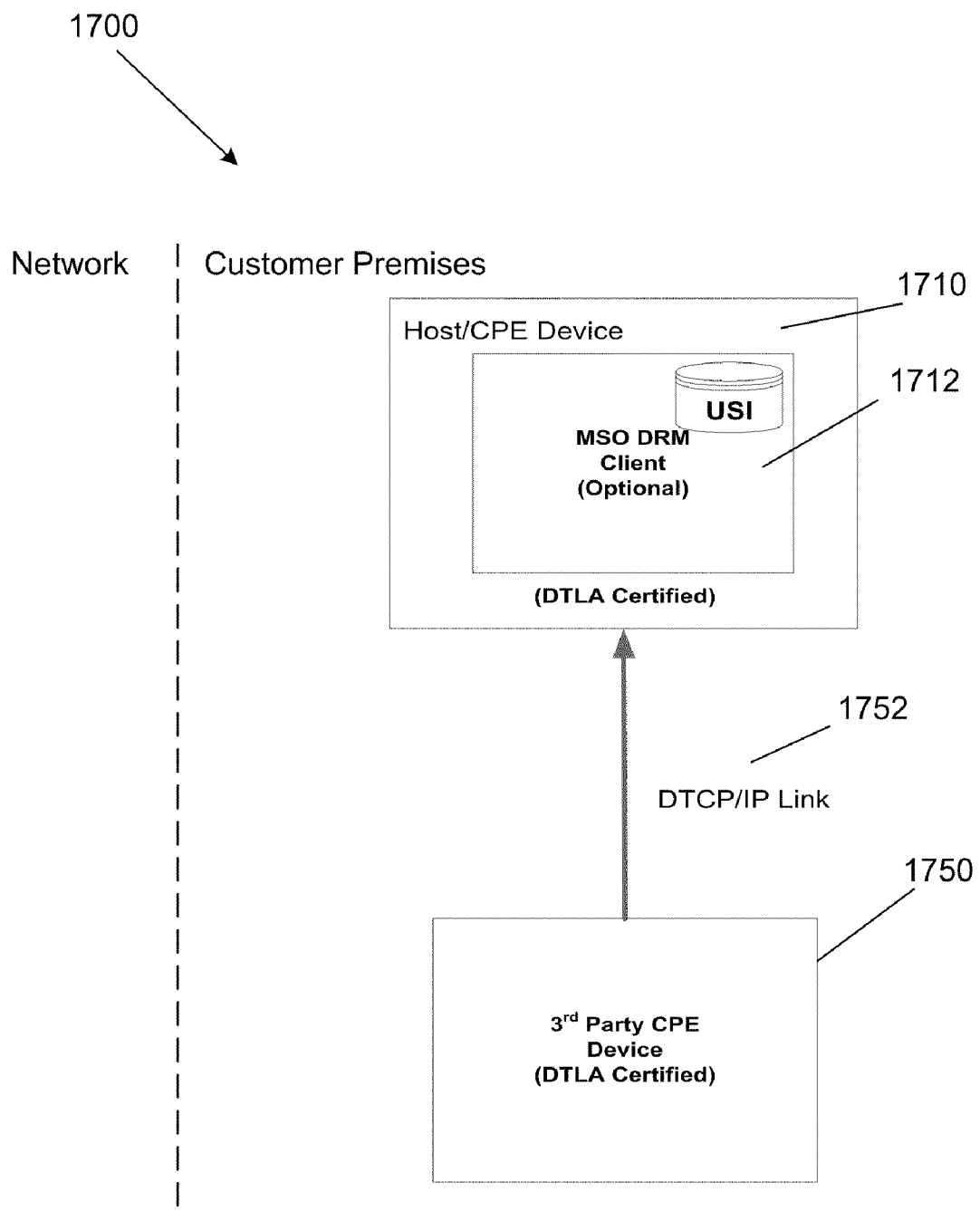
FIG. 17 illustrates the acquisition of content via a DTCP-IP enabled connection according to an embodiment of the invention.

FIG. 17 illustrates the acquisition of content via a DTCP-IP enabled connection 1700 according to an embodiment of the invention. In FIG. 17, content has been acquired on a DTCP/IP enabled device 1750 that is connected to other DTCP/IP enabled devices within the in-home domain. There are no MSO usage rules supplied with the third party content.

The acquiring device, i.e., the Host/CPE device 1710, and the third party device 1750 exchange DTCP certificates and System Renewability Message data via the DTCP-IP link 1752 to verify their revocation status within the DTLA infrastructure. The third party device 1750 determines that the content can be delivered to a DTCP/IP enabled device based on its DRM license or other proprietary information. The third party device 1750 scrambles the content according DTCP delivery rules and forwards the content and the content keys to the Host/CPE device 1710.

The Host/CPE device 1710 examines the EMI information in the IP packets delivered to it and descrambles the content using the provided content key. If the content contains CCI bits, the Host/CPE device 1710 correlates the EMI information with the CCI bits and acts according to DTCP/IP rules for content. The Host/CPE device 1710 honors the EMI information provided with the content and honors any default rules applied to content acquired over DTCP/IP into the domain of the Host/CPE device 1710. Since there are no MSO Usage Rules supplied with the content, there may be a set of default rules that the MSO DRM client 1712 needs to apply beyond the EMI/CCI bits supplied with the content, e.g., OpenCable BOCR-HMS content protection requirements. However, no mediation service is used for the transfer of content between DTCP/IP enabled devices.

Figure 18:
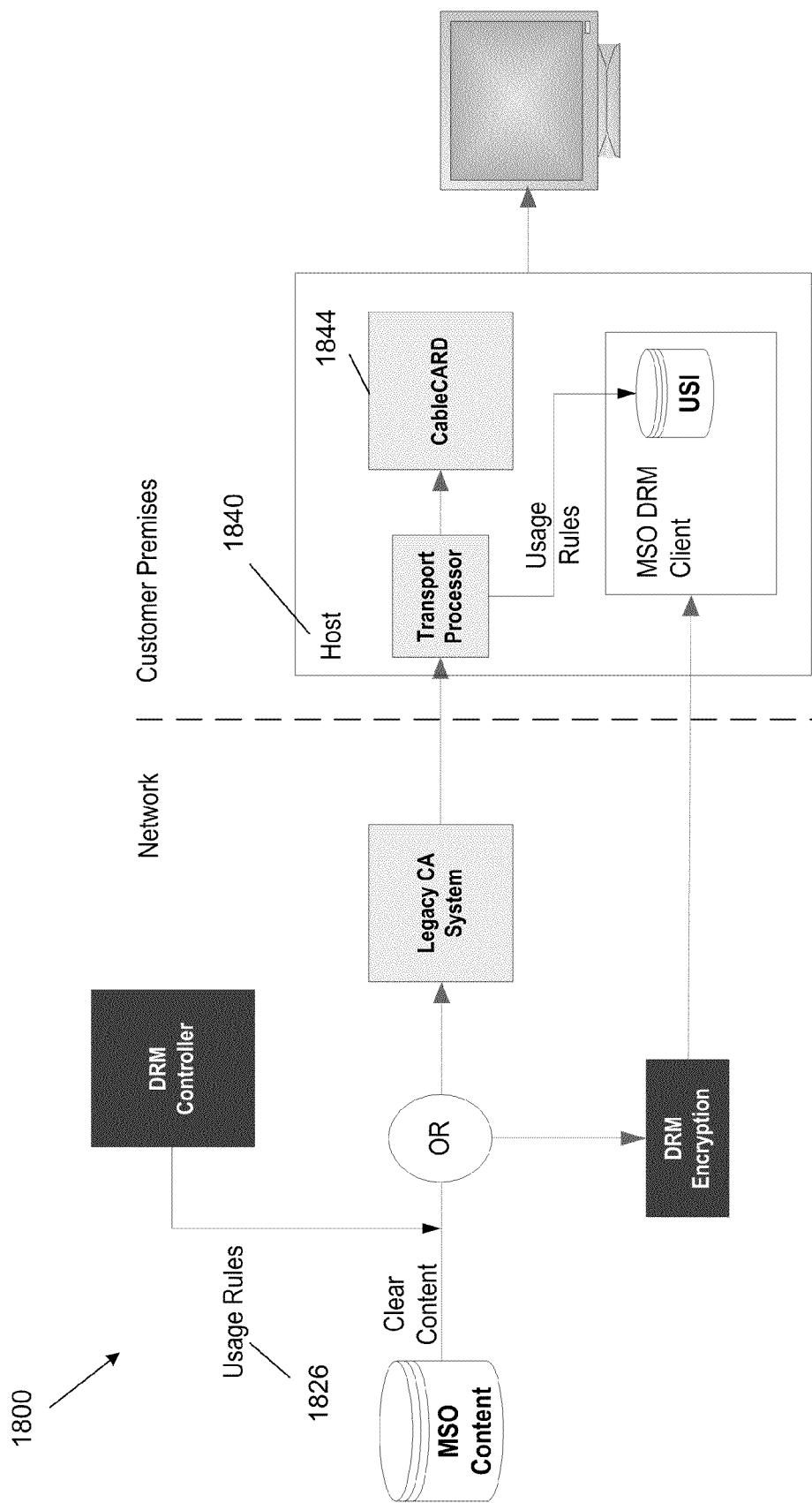
FIG. 18 illustrates the consumption by a local MSO enabled Host/CPE device of conditional access or DRM acquired content according to an embodiment of the invention.

FIG. 18 illustrates the consumption by a local MSO enabled Host/CPE device of conditional access or DRM acquired content 1800 according to an embodiment of the invention. Herein, the term consumption relates to content that is being played out to a rendering device but is not being stored or copied on that device. In some of the use cases, content is under the control of the CA system, but may also include CUI as defined by a DRM system. In other use cases content is only under the control of a DRM system.

In FIG. 18, content is delivered over the cable network at the point of acquisition of that content. The flow illustrated in FIG. 18 is an extension to current CableCard enabled device behavior in that it supplements the core CCI bits with additional MSO usage rules carried with the content. Content is passed through the CableCard 1844 and any CA scrambled content is descrambled by the CableCard 1844. High value content, as defined by the CCI bits, is then rescrambled under CableCard control and forwarded to the Host device 1840. Other content is forwarded to the Host device 1840 in the clear.

The headend forwards any additional MSO usage rules 1826 to the Host device 1840 over an agreed input source. The additional rules need to be authenticated by the Host device 1840 before enforcement. The Host 1840 reviews the MSO usage rules and validates that the content is available for rendering to the consumption point. For example, the Selectable Output Control rules may prohibit rendering or restrict the resolution of the output, or there may be a limit on the number of consumption points to which this content can be concurrently rendered.

The Host 1840 descrambles the content and applies any format changes necessary prior to rendering the content at the consumption point. The Host 1840 updates the Content Usage Information to indicate that the content is being consumed by the Host 1840. At the end of content play, the Host 1840 may update the Content Usage Information to indicate that the content is no longer being consumed by the Host 1840.

FIG. 18 further illustrates the consumption by a Host/CPE device of DRM delivered content. In FIG. 18, the DRM encryption 1822 in the headend performs a key exchange with the MSO DRM client 1850 of the Host/CPE device 1840 to provide content protection keys.

The headend delivers DRM protected content to the Host/CPE device 1840 independently from the CableCard 1844.

The headend forwards any additional MSO usage rules 1826 to the Host/CPE device 1840 over an agreed input source. The additional rules need to be authenticated by the Host/CPE device 1840 before enforcement.

The Host/CPE device 1840 reviews the MSO usage rules and validates that the content is available for rendering to the consumption point. For example, the Selectable Output Control rules may prohibit rendering or restrict the resolution of the output, or there may be a limit on the number of consumption points to which this content can be concurrently rendered. The Host/CPE device 1840 descrambles the content and applies any format changes necessary prior to rendering the content at the consumption point.

The Host/CPE device 1840 updates the Content Usage Information to indicate that the content is being consumed by the Host/CPE device 1840. At the end of content play, the Host/CPE device 1840 may update the Content Usage Information to indicate that the content is no longer being consumed by the Host/CPE device 1840.

Figure 19:
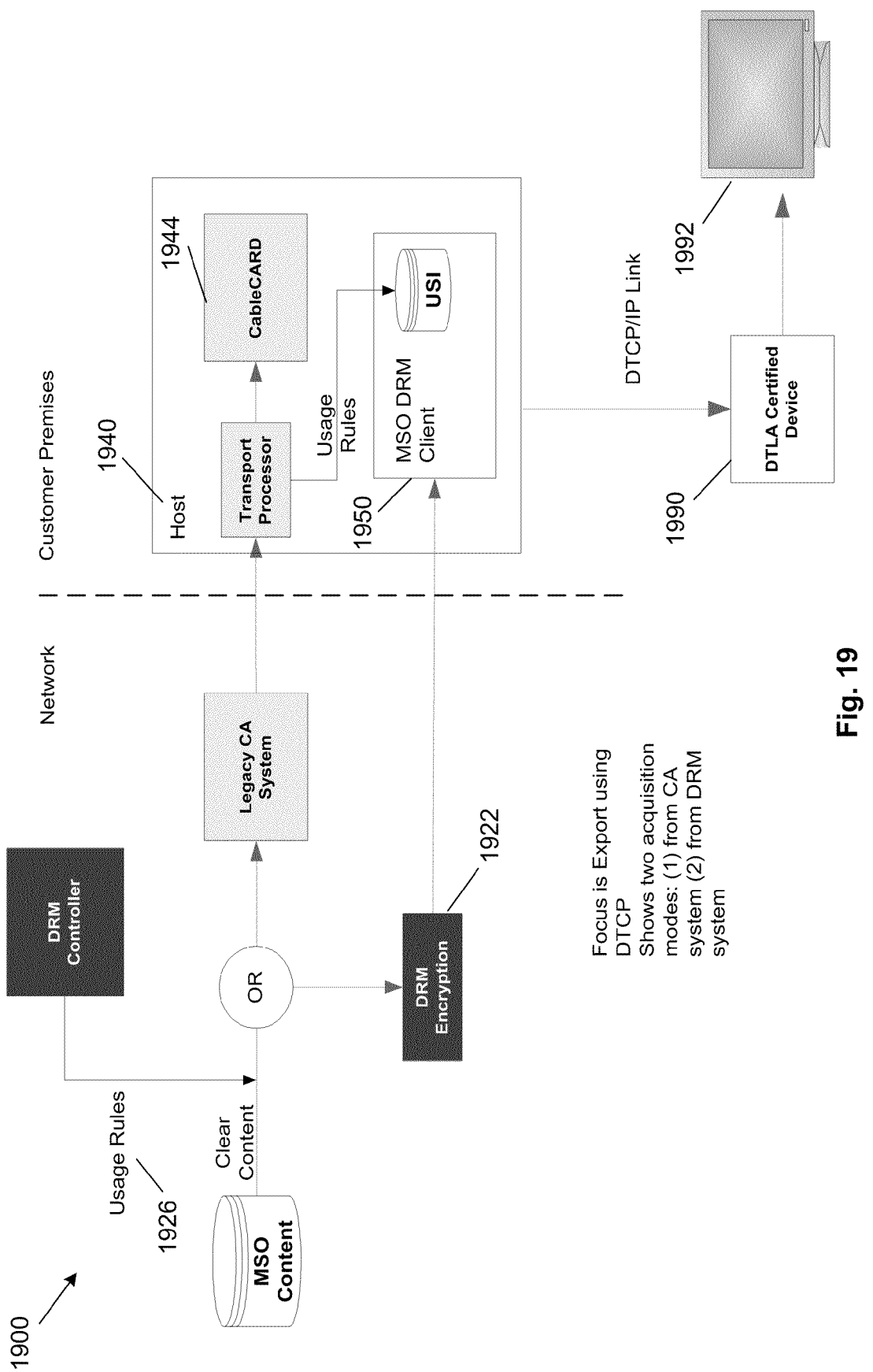
FIG. 19 illustrates the consumption by a DTCP-IP enabled device according to an embodiment of the invention.

FIG. 19 illustrates the consumption by a DTCP-IP enabled device 1900 according to an embodiment of the invention. In FIG. 19, content is delivered over a cable network by a device that is DTCP-IP enabled and able to receive content from a CableCard enabled or DRM enabled device. The Host device 1940 acts as a DTCP-IP source to provide the content to the DTCP/IP enabled sink device 1990. The Host device 1940 verifies the sink device 1990 and performs a DTCP-IP key exchange with the sink device 1990.

The Host device 1940 verifies that the Selectable Output Control within the MSO usage rules allow rendering of content to the sink device 1990. This may involve the sink device 1990 declaring its capabilities to the Host device 1940. Alternatively, the DTLA may embed some details of capabilities in the Device Identifier. This also requires the carriage of Selectable Output Control information with the content.

The Host device 1940 descrambles the content that it has acquired from the CableCard 1944 or as DRM scrambled content directly from the DRM encryption system 1922, and rescrambles the content for DTCP-IP transmission using the key exchanged with the sink device 1990. The Host device 1940 may modify the CCI bits from Copy Once to Copy No More if this is required by the MSO usage rules 1922 and the device characteristics of the sink device 1990. The Host device 1940 includes EMI bits in packets delivered to the sink device as required by DTCP-IP.

The Host device 1940 updates its Content Usage Information to indicate that the content is being consumed by the DTCP-IP sink device 1990. At the end of content play, the Host device 1940 may update the Content Usage Information to indicate that the content is no longer being consumed by the Host device 1940. The sink device 1990 descrambles the content and renders the content to the viewer 1992.

Figure 20:
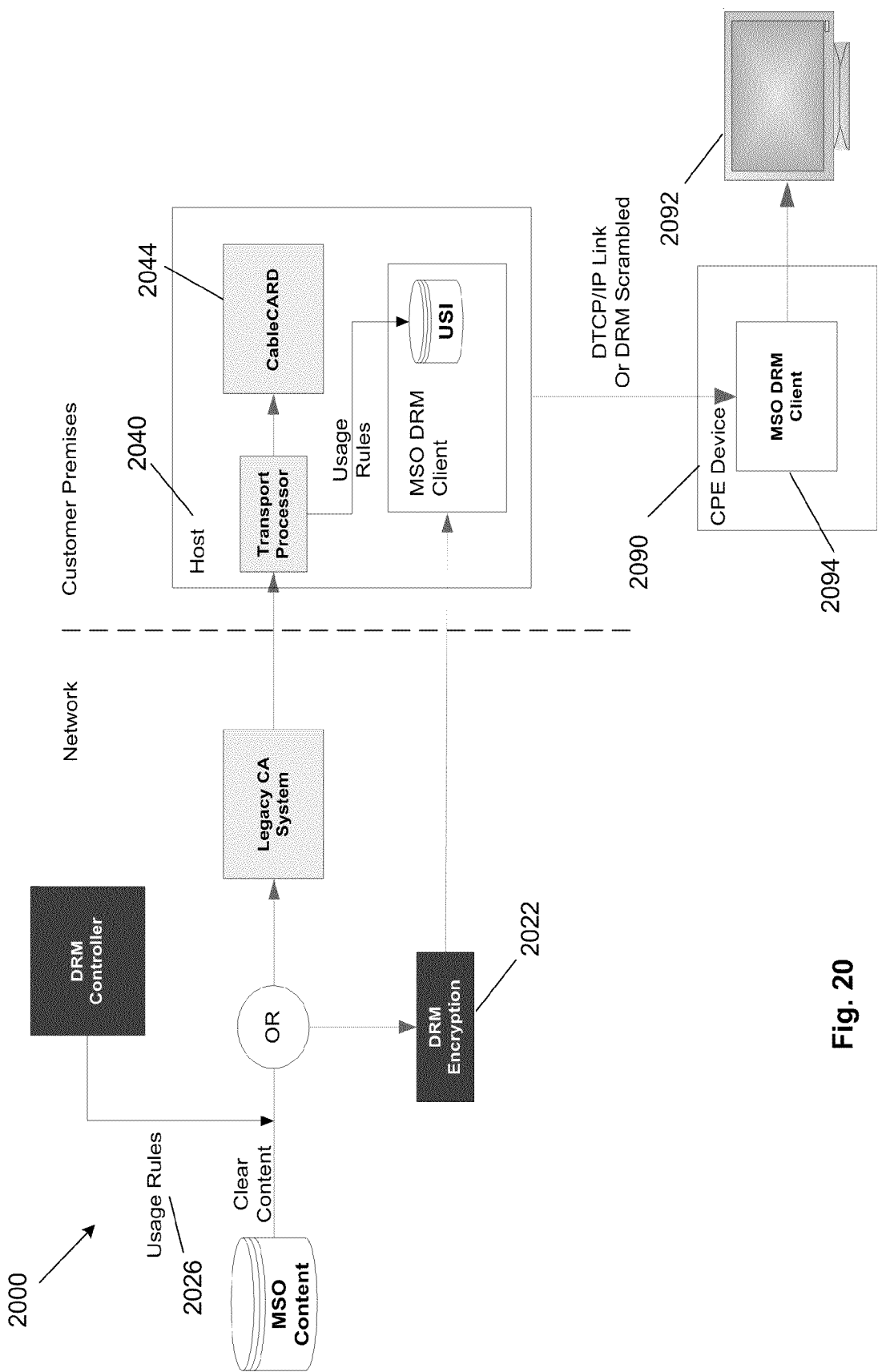
FIG. 20 illustrates the consumption of content by a managed device according to an embodiment of the invention.

FIG. 20 illustrates the consumption of content by a managed device 2000 according to an embodiment of the invention. In FIG. 20, content is delivered over the cable network to a CPE device 2090 that is registered within the user's managed domain. DTCP/IP link layer provide protection for consumption of the content. If the sink device 2090 is also a DTCP-IP enabled device, the source device 2040 can choose whether it supplies the content under the control of the preferred DRM or under the control of DTCP/IP. Consumption controlled by the preferred DRM has the advantage of being able to fully transfer the MSO usage rules which may not be fully expressible under DTCP-IP control.

The Host device 2040 verifies that the sink device 2090 is a member of the user's managed domain, that the sink device 2090 is DTCP-IP enabled and that the MSO usage rules 2026, including the Selectable Output Control, and Content Usage Information allow the content to be consumed by the sink device 2090. The Host device 2040 also verifies that DTCP-IP link layer protection is sufficient to provide the content protection required by the MSO usage rules 2026.

The Host device 2040 exchanges a content scrambling key with the sink device 2090 under the robustness rules applicable to DTCP-IP link layer protection. The Host device 2040 provides the MSO usage rules 2026 and the Content Usage Information applicable to this content to the DRM Client 2094 on the sink device.

The Host device 2040 descrambles the content that it has acquired from the CableCard 2044 or as DRM scrambled content directly from the DRM encryption system 2022, and rescrambles the content for distribution to the sink device 2090 within the preferred domain. The Host device 2040 may modify the CCI bits for Copy Once content to Copy No More, if this is required by the MSO usage rules 2026.

The Host device 2040 updates its Content Usage Information to indicate that the content is being consumed by the sink device 2090. At the end of content play, the Host device 2040 may update the Content Usage Information to indicate that the content is no longer being consumed by the managed device 2090. The sink device 2090 descrambles the content and renders the content to the viewer 2092.

FIG. 20 also illustrates the consumption of content under managed DRM scrambling. In this case, the sink device 2090 does not support DTCP-IP. Such a device may be a computer that has a DRM Client installed or the MSO usage rules 2026 do not allow delivery of content over DTCP-IP. The Host device 2040 verifies that the sink device 2090 is a member of the user's managed domain and that the MSO usage rules 2026, including the Selectable Output Control, and Content Usage Information allow the content to be consumed by the sink device 2090. It is assumed that the verification process provides sufficient information about the sink device 2090 to assess its capabilities.

The Host device 2040 exchanges a content scrambling key with the sink device 2090 under the robustness rules applicable to the preferred DRM. If the content has been acquired directly from the DRM encryption system 2022, this should be the scrambling key for that content; otherwise, a new content scrambling key is used.

If the content has been acquired from the CableCard 2044, the Host device 2040 descrambles and rescrambles the content for distribution to the sink device 20900 within the preferred domain. The Host device 2040 securely provides MSO usage rules to the sink device 2090. The Host device 2040 may modify the CCI bits for Copy Once content to Copy No More, if this is required by the MSO usage rules 2026. The Host device 2040 manages Content Usage Information and may include directives to the sink device 2090 that require it validate such information before forwarding the content for consumption on another device.

The Host device 2040 updates its Content Usage Information to indicate that the content is being consumed by the sink device 2090. At the end of content play, the Host device 2040 may update the Content Usage Information to indicate that the content is no longer being consumed by the sink device 2090. The sink device 2090 descrambles the content and renders the content to the viewer 2092.

Still further, FIG. 20 also illustrates the consumption of content limited to a local domain. In this case, the MSO usage rules 2026 limit the rendering of content to devices that are in the same locality as the Host device 2040. The Host device 2040 verifies that the sink device 2090 is a member of the user's managed domain and that the MSO usage rules 2026, including the Selectable Output Control, and Content Usage Information allow the content to be consumed by the sink device 2090. It is assumed that the verification process provides sufficient information about the sink device 2090 to assess its capabilities.

The Host device 2040 performs a proximity test to validate that the sink device 2090 is attached to the local network addressable from the Host device 2040. The form of proximity test needs to be defined for the managed DRM and may include knowledge of the protocols used in content transfer and measurement of round trip times for specific data packets transmitted from source to sink device 2090. Proximity tests may need to be conducted periodically during content transmission to identify mobile devices that move away from the local domain.

FIG. 20 also illustrates the consumption of content limited by CUI directives. In this case, the MSO usage rules limit the rendering of content to a particular period of time or place it under the control of a subscription or one time payment. For example, a recorded show may only be freely viewed for a period of seven days after it has been broadcast, or a live show may only be concurrently rendered to multiple devices on subscription to enhanced service programs.

The Host device 2040 verifies that the sink device is a member of the user's managed domain and that the MSO usage rules 2026, including the Selectable Output Control, and the derived Content Usage Information allow the content to be consumed by the sink device 2090. The Host device 2040 verifies that the time constraints expressed in the CUI have been met. This assumes that the Host device 2040 has access to secure time and is regularly correlating its real time clock against the secure time source.

The Host device 2040 verifies the subscription status of the user against the MSO usage rules 2026. This may require the Host device 2040 to access service subscription information from the headend at defined intervals.

Figure 21:
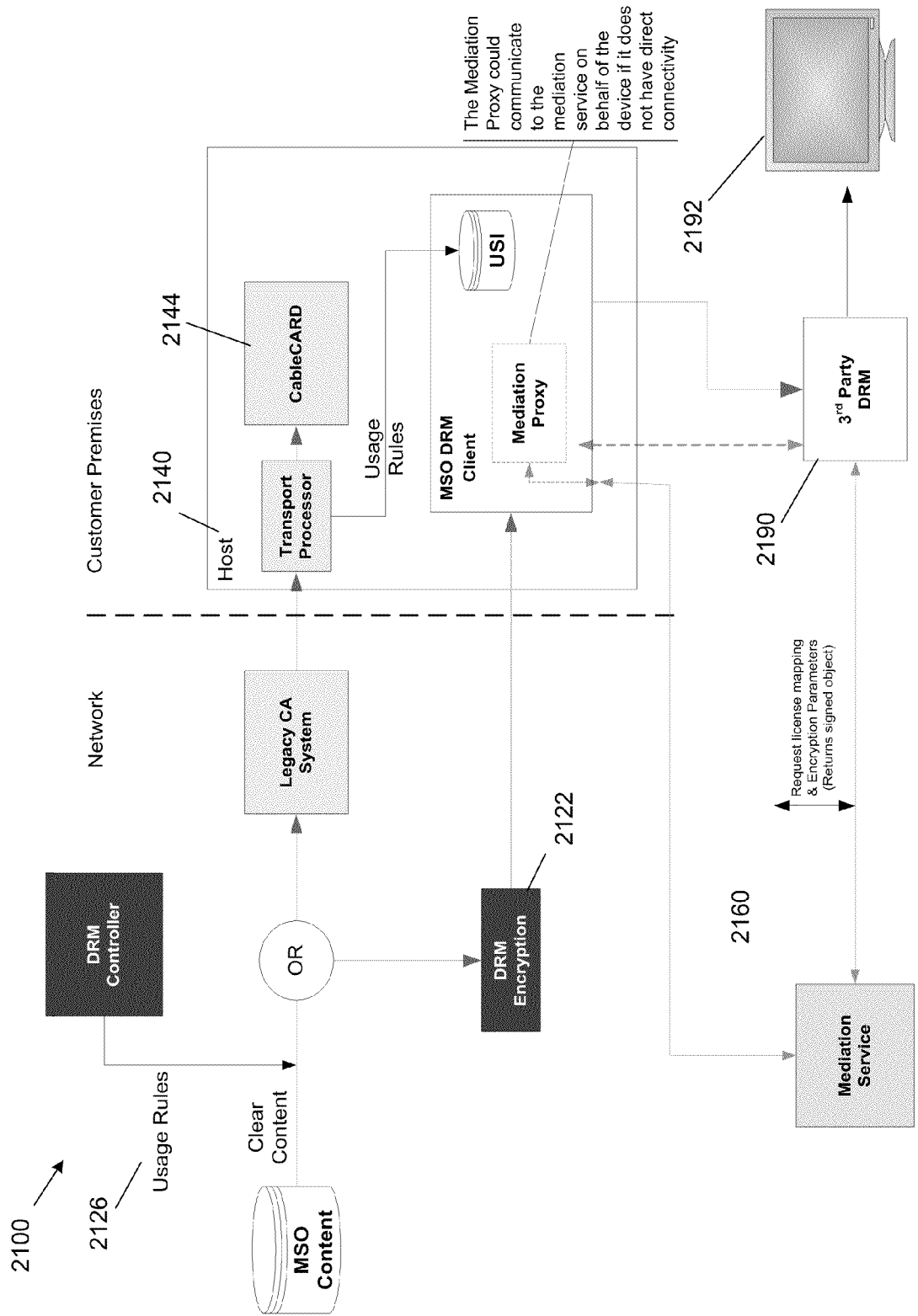
FIG. 21 illustrates the consumption of content by a third party DRM device according to an embodiment of the invention.

FIG. 21 illustrates the consumption of content by a third party DRM device 2100 according to an embodiment of the invention. The main use for this case is the delivery of content to user's iPODs and other CPE obtained through retail channels. Further, in this case, the content owner and content provider have agreed to allow content sharing to the level specified by the use case.

The Host device 2140 identifies that the sink device 2190 is not a member of the user's managed domain. The MSO usage rules 2126, including the Selectable Output Control, and Content Usage Information allow the content to be consumed by the sink device 2190 managed under a third party DRM. It is assumed that the identification process provides sufficient information about the sink device 2190 to recognize the domain under which it is controlled and to assess its capabilities.

The Host device 2140 requests a DRM license for content distribution to the sink device 2190 from a mediation service 2160. The DRM license contains terms which reflect the MSO usage rules and Content Usage Information available at the time of the license request. This may involve the transfer of certain usage rights to the recipient's DRM. For example, if the MSO usage rules 2126 allow five concurrent renditions of the content, the requested DRM license could reflect the ability to make one rendition in the third party domain and retain four in the managed DRM domain. The Content Usage Information would be updated to account for the provisions of the DRM license granted in the third party domain.

The mediation service 2160 negotiates the content format, key exchange mechanism and scrambling algorithm that will be used in the content transfer and provides these details to the source and sink devices 2190. The Host device 2140 exchanges a content scrambling key with the sink device 2190 under the robustness rules applicable to the sink device 2190. Either the Host device 2140 acting as a proxy for the mediation service 2160 or the mediation service 2160 directly provides the newly generated DRM license to the sink device 2190. The mediation service 2160 instructs the Host device 2140 to translate the content format to one that is acceptable within the third party domain. This may involve reducing the resolution of the content or a complete change of audio format, e.g., MP3 to AAC.

The Host device 2140 descrambles the content that it has acquired from the CableCard 2144 or directly from the DRM encryption system 2122 and rescrambles the content for distribution to the sink device 2190 within the third party domain using a scrambling algorithm suitable for that domain. The Host device 2140 may modify the CCI bits for Copy Once content to Copy No More, if this is required by the MSO usage rules 2126. However, the third party DRM may not be cognizant of the meaning of the CCI bits and the primary control is the DRM license supplied to the sink device 2190.

The Host device 2140 communicates the DRM license obtained from the mediation service to the sink device 2190. This model assumes that the sink device 2190 does not have network access capability and needs to use the Host device 2140 as a proxy to obtain the DRM license. The DRM license is authenticated by the mediation service 2160 and could be encrypted specifically for the sink device 2190 to prevent tampering by the Host device 2140.

The Host device 2140 may update its Content Usage Information to indicate that the content is being consumed by the third party DRM managed sink device 2190. At the end of content play, the Host device 2140 may update the Content Usage Information to indicate that the content is no longer being consumed by the sink device 2190. The sink device 2190 descrambles the content and renders the content to the viewer 2192.

Next, examples describing the storage of content in either fixed or removable media. Storage is only allowed for content that is marked as Copy Once or Copy Freely and is subject to MSO usage rules if present. Storage is distinguished from content export in that stored content remains within the confines of a managed domain and under the constraint of MSO usage rules, whereas exported content is either controlled by CCI bits, e.g., in the case of content exported over DTCP/IP, or controlled by the rules expressed in a third party DRM license.

Figure 22:
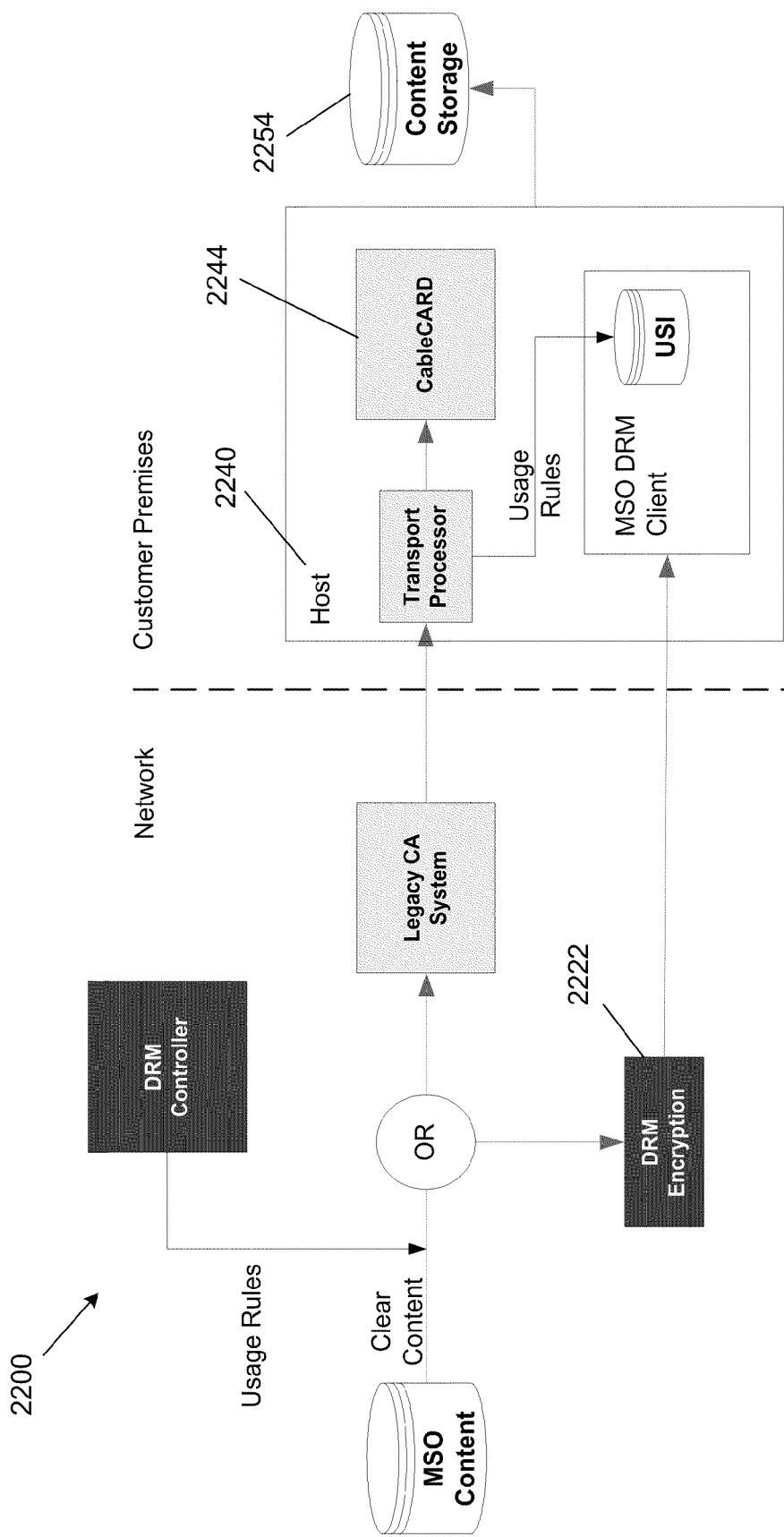
FIG. 22 illustrates the storage of content on the Host/CPE device according to an embodiment of the invention.

FIG. 22 illustrates the storage of content on the Host/CPE device 2200 according to an embodiment of the invention. In FIG. 22, content is stored on a Host device 2240 that provides a DVR capability and equates to the currently available DVR device content storage capabilities. The Host device 2240 verifies that the CCI bits in the transport stream allow the copying of content. The Host device 2240 also verifies that the Selectable Output Controls allow storage to the selected storage device/media 2254.

The Host device 2240 receives content, either in the clear or copy protected, from the CableCard 2244 or directly from the DRM encryption system 2222 and modifies the CCI bits in the transport stream for Copy Once content to indicate that this content is Copy No More.

The Host device 2240 stores the content, its associated metadata, its MSO usage rules, Content Usage Information and scrambling keys. For content acquired from the Cable-Card 2244, this limits the content to being replayed on the Host device 2240, since the scrambling keys are only accessible by the CableCard 2244 from which they were generated.

The standard DVR functions are used to examine and present stored content metadata to the user and to select content for replay. Once selected, content that is originally acquired from the CableCard 2244 can only be unscrambled through the CableCard 2244, though it could be consumed by a device other than the Host device 2240.

The Content Usage Information supplied with the stored content can define restrictions on the future consumption, storage and exporting of that content. For example, the CUI could restrict the number of concurrent consumptions for a piece of content, the number of times the content can be played or the viewing window for the content, either as specific date range or as an elapsed period from time of storage, or from time of first viewing.

Figure 23:
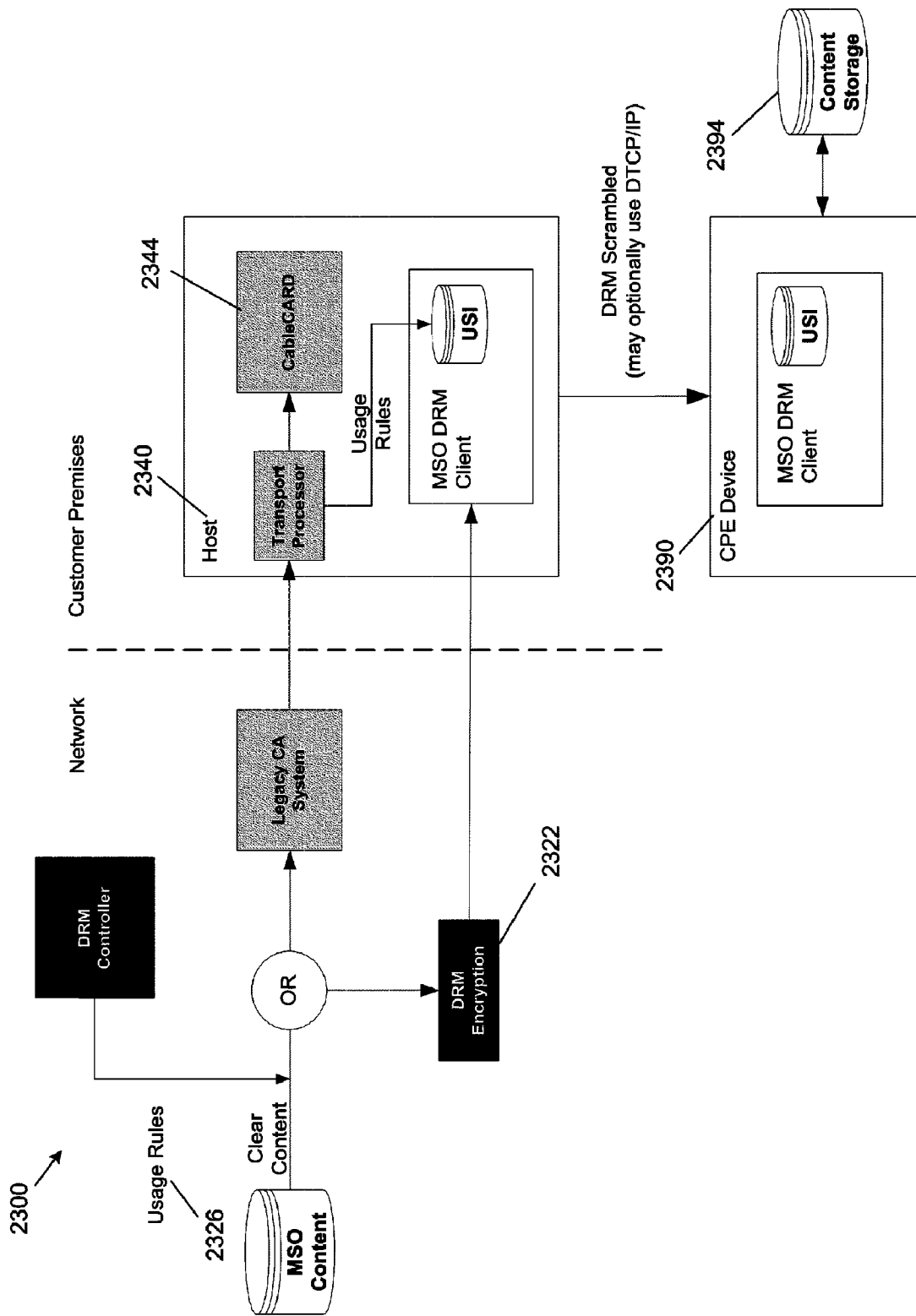
FIG. 23 illustrates the storage of content on a device in a managed domain according to an embodiment of the invention.

FIG. 23 illustrates the storage of content on a device in a managed domain 2300 according to an embodiment of the invention. In FIG. 23, content is distributed to other sink devices 2390 within the managed user's domain. The managed user's domain may be subdivided into a local domain for devices that are connected to the CableCard 2344 enabled Host device 2340, a geographically restricted domain for devices that are mobile where content consumption is limited by geographic constraints, or a "world-wide" domain that is unrestricted by geographic constraints.

Content originally acquired from through CableCard 2344 is no longer coupled to the CableCard 2344 and the scrambling keys are associated with the managed domain. This case is a DRM only use case. DTCP alone is not sufficient to manage advanced content usage models such as consumption counts. The Host device 2340 verifies that the sink device 2390 is accessible from the managed domain and also checks that the MSO usage rules 2326 associated with the content allow content storage on the sink device 2190.

The Host device 2340 verifies that the CCI bits in the transport stream allow the copying of content. The Host device 2340 also verifies that the Selectable Output Controls allow storage to the selected storage device/media 2394. The Host device 2340 and the sink device 2390 exchange a content scrambling key according to the robustness rules for preferred DRM. The content key may also be encrypted with a master key so as to allow transfer of the content into another managed domain upon authorization of the preferred DRM to make such a transfer.

The Host device 2340 receives content, either in the clear or copy protected, from the CableCard 2344 or directly from the DRM encryption system 2322 and modifies the CCI bits in the transport stream for Copy Once content to indicate that this content is Copy No More. The Host device 2340 rescrambles the content with the content scrambling key exchanged with the sink device 2390 and delivers the scrambled content, associated metadata and MSO usage rules 2326 to the sink device 2390. The Host device 2340 encrypts the content scrambling key for the sink device and, possibly, with the master key. The stored content can only be descrambled by the sink device 2390 which securely holds the content scrambling key. That sink device 2390 could move the content to another device in the managed domain subject to the constraints in the MSO usage rules 2326. However, the move operation would incur a descrambling and rescrambling operation to associate it with the receiving device.

Where the MSO usage rules 2326 allow for the content to be stored or rendered to any device in the domain, the content could be scrambled using a content key that is accessible to all devices in the domain, i.e., a user's domain key managed within the DRM. This would avoid the need to descramble and rescramble the content on each transmission since all devices in the user's domain would share a common key that could be used to access the scrambling key. The master key may be a content specific key that enables the scrambled content to be moved to a new device. The new device can recover the master key from the headend and use this to recover the content scrambling key independently from the sink device 2390 that originally stored the scrambled content.

The Host device 2340 updates its Content Usage Information to indicate that a copy has been made to a device in the user's managed domain. The DVR functions are extended to aggregate content metadata across devices in the user's managed domain. The user can select content from these different devices for playback or move content between accessible devices to maximize use of available storage 2394.

In addition content may be moved or copied between devices in the same managed domain. This case describes the user managed movement or copying of content stored on one managed device 2340 to another managed device in the same user domain. The source device 2340 verifies that the sink device 2390 is accessible from the managed domain and also checks that the Content Usage Information associated with the content allow content storage on the sink device 2390. If the content is being copied the Copy Control Information within the content is examined and its rules are enforced.

If the content is scrambled with a device specific key, the source device and the sink device 2390 exchange a content scrambling key according to the robustness rules for preferred DRM. The source device descrambles and rescrambles the content to the freshly exchanged content key. The source device 2340 transmits the rescrambled content and the MSO usage rules 2326 to the sink device 2390. If required by the robustness rules for the preferred DRM, the source device indicates to the Host device 2340 that the content has been moved to another managed device. The Host device 2340 can use this information to update its Content Usage Information.

If content watermarking is introduced, the content may include watermarking data that indicates each client device on which it has been stored since receipt. Watermarking should provide evidence of the chain of devices that have handled the content during its journey from the origination point to the device which now stores the content. If the content is being moved, the Host device 2340 removes the content and the metadata from its storage and indicates that it no longer stores this content to the DVR functions. There may be a need for a transaction based exchange between the Host device 2340 and sink devices 2390 to facilitate a move and to ensure that the two devices do not each contain an accessible copy of the content.

If the content is being copied, the Host device 2340 updates its CUI to indicate that a copy has been provided to the sink device 2390. The original content copy on the source could CCI bits that show Copy Once. The Host device 2340 could change these to indicate that the content is Copy No More or could rely on the updated CUI associated with the content to limit further copying.

Figure 24:
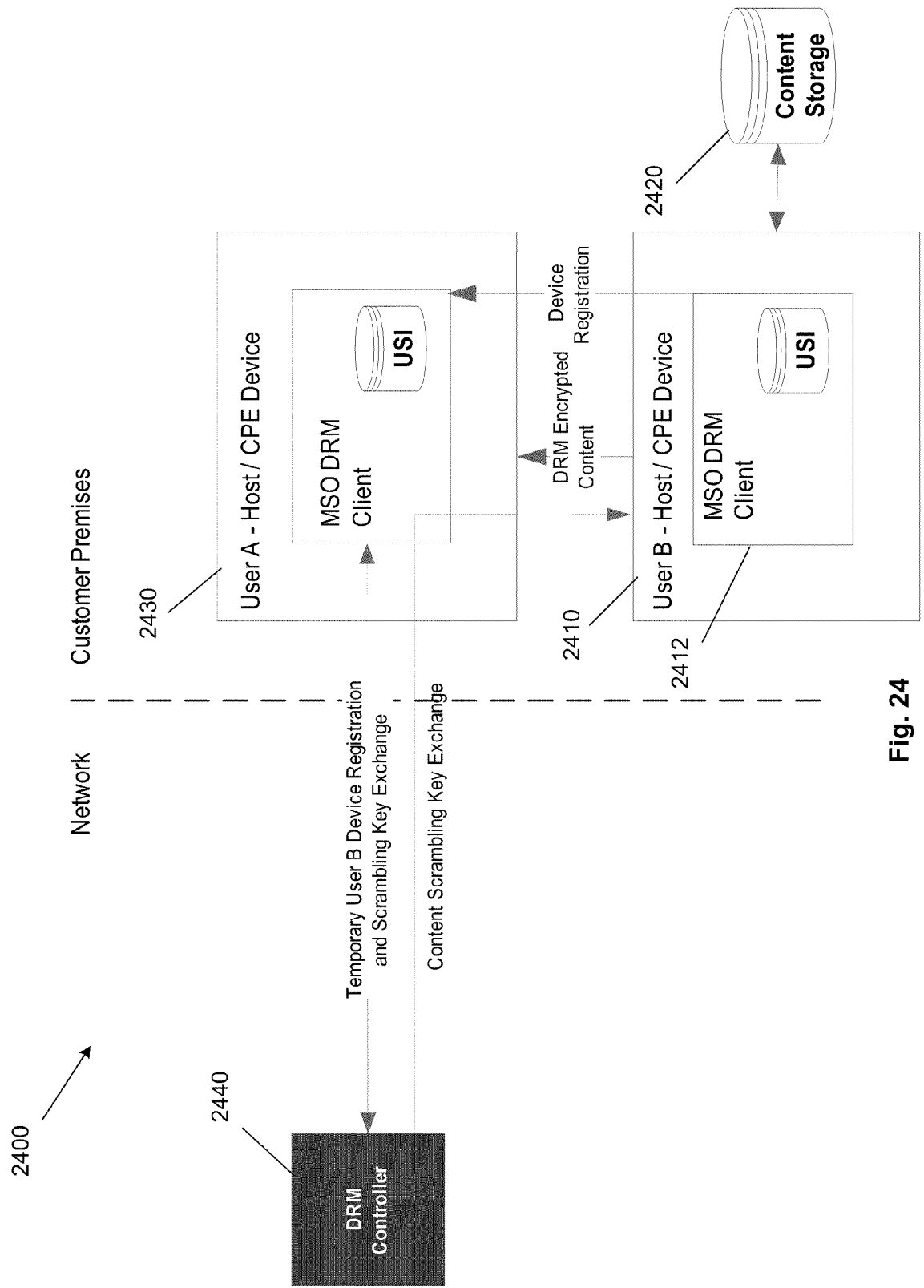
FIG. 24 illustrates content exchange between different domains according to an embodiment of the invention.

FIG. 24 illustrates content exchange between different domains 2400 according to an embodiment of the invention. In FIG. 24, two or more users with separate managed domains may share content between the devices in those domains subject to the constraints expressed in the MSO usage rules. FIG. 24 shows User B 2410 having stored content 2420 and its associated MSO usage rules per the MSO DRM client 2412 on a portable device registered to its managed domain. The MSO usage rules provided by the MSO DRM client 2412 allow one copy to be stored on a single device within this domain.

User A 2430 also subscribes to services and has a distinct managed user domain. User A 2430 missed a live show, but knows that User B 2410 recorded the broadcast. User B 2430 connects the source device 2410 containing the recorded show to the domain of User A 2430 and requests the DRM controller 2440 to provide a temporary registration to that domain. The DRM controller 2440 grants a time limited registration for the source device 2410 to the domain of User A 2430.

The source device 2410 exchanges and verifies credentials with the sink device 2430. The content is moved or consumed as described above. This use case assumes that the MSO usage rules provide restriction on content that cannot be moved or rendered under a temporary registration. If these restrictions can be described in the MSO usage rules, the temporary registration will not need to be aware of individual pieces of content.

Figure 25:
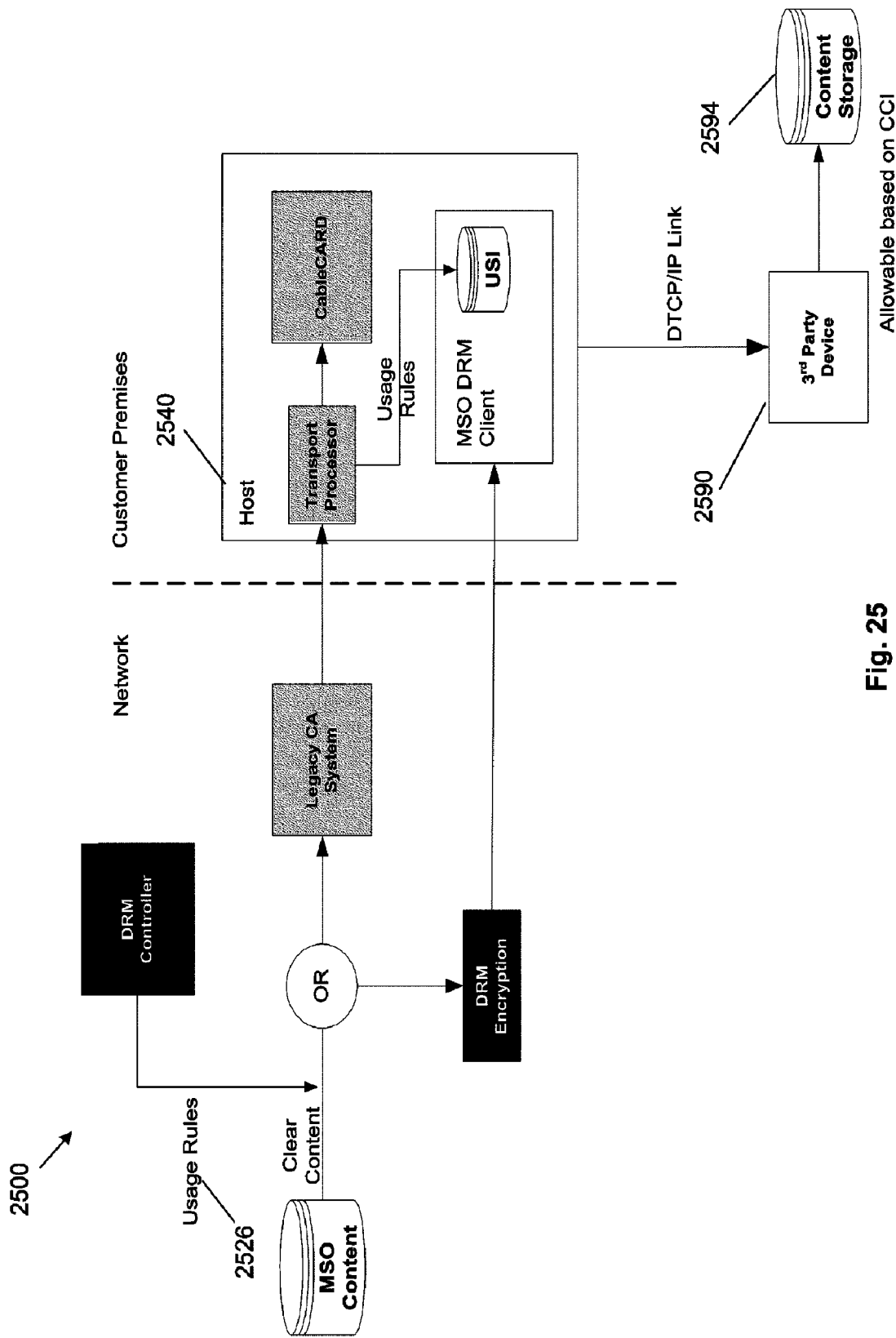
FIG. 25 illustrates content being exported to a DTCP-IP device according to an embodiment of the invention.

FIG. 25 illustrates content being exported to a DTCP-IP device 2500 according to an embodiment of the invention. FIG. 25 shows the copying or movement of content to a device that is not a member of the user's managed domain. After the move or copy function completes the content is no longer governed by the managed domain, but may be covered by a DRM license applicable to the domain in which the content now resides. The MSO usage rules 2526 and derived CUI can allow or restrict the export of content to those devices that are DTCP-IP enabled or managed through a third party DRM.

In FIG. 25, content is moved to a DTCP-IP enabled device 2490 that provides storage 2594 for that content. It is assumed that the DTCP-IP enabled device 2590 is not registered to the managed domain or to a third party domain that provides a mediation service with the managed domain. The source device 2540 in the managed domain is assumed to be DTCP-IP enabled. The source device 2540 exchanges and verifies DTLA certificates with the sink device 2590. The DTLA may include some device information in the certificate that can be used to assess the capabilities of the sink device 2590.

The source device 2540 verifies that the MSO usage rules 2526 allow the copying or movement of content to the sink device 2590. If the content is to be copied, the CCI bits for the content of source device 2540 need to indicate Copy Freely or Copy Once. If the content is to be moved, these CCI bits need to indicate Copy Freely, Copy Once or Copy No More.

The Host device 2540 verifies that the current Content Usage Information allows copying or movement to the DTCP-IP sink device 2590. The source device 2590 exchanges DTCP-IP content scrambling keys with the sink device 2590. The source device 2540 descrambles the content, if it is not currently in the clear, and, if the content is being copied, changes the CCI bits to indicate that Copy Once content is now Copy No More. The source device 2540 generates the appropriate EMI for the content according to the DTCP-IP specification and rescrambles the content with the DTCP-IP content scrambling keys.

If the content is being moved, the source device 2540 removes the content and the metadata and indicates that it no longer has the content to DVR functions. There may be a need for a transaction based exchange between the source device 2540 and the sink device 2590 to facilitate a move and to ensure that the two devices 2540, 2590 do not each contain an accessible copy of the content.

If the content is being copied, the source device 2540 updates its CUI to indicate that a copy has been provided to the sink device 2590. The original content copy on the source device 2540 could have CCI bits that show Copy Once. The source device 2540 could change these to indicate that the content is Copy No More or could rely on the updated CUI associated with the content to limit further copying.

Figure 26:
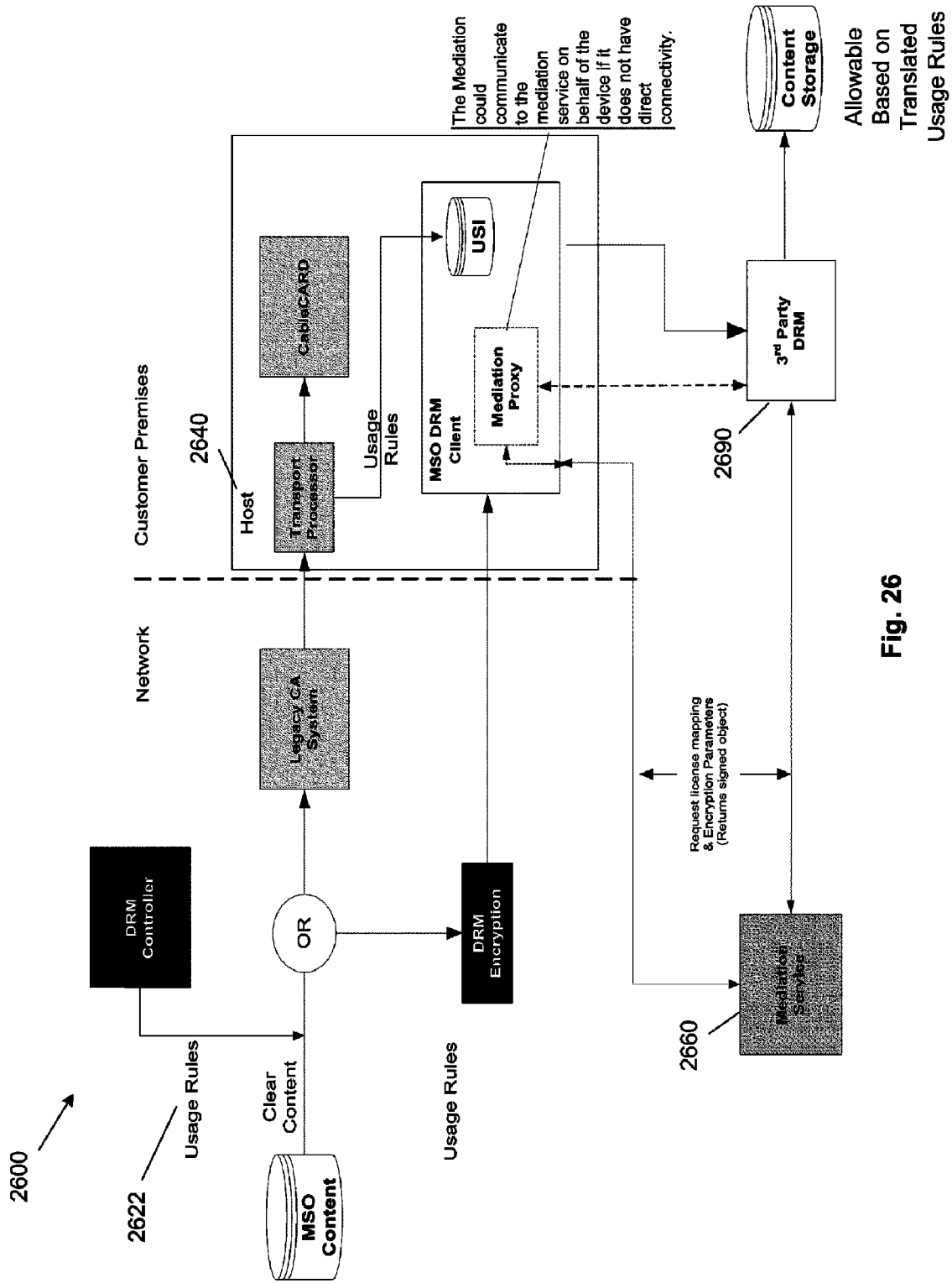
FIG. 26 illustrates content being exported to a third party managed DRM domain according to an embodiment of the invention.

FIG. 26 illustrates content being exported to a third party managed DRM domain 2600 according to an embodiment of the invention. In FIG. 26, stored content is transferred from a source device 2640 in the user's managed domain to a sink device 2690 managed by a third party where there is a mediation service 2660 that transfer license information between these domains.

The source device 2640 identifies that the sink device 2690 is not a member of the user's managed domain. The MSO usage rules 2626, including the Selectable Output Control, and Content Usage Information allow the content to be moved or copied to the sink device 2690 managed under a third party DRM. It is assumed that the identification process provides sufficient information about the sink device 2690 to recognize the domain under which it is controlled and to assess its capabilities.

The sink device 2690, e.g., possibly using the Host device 2640 as a proxy, requests a DRM license for content distribution to the sink device 2690 from a mediation service 2660. The DRM license contains terms which reflect the MSO usage rules 2626 and Content Usage Information available at the time of the license request. This may involve the transfer of certain usage rights to the recipient's DRM. For example, if the MSO usage rules allow five copies of the content, the requested DRM license could reflect the ability to make two copies in the third party domain and retain three in the user's managed DRM domain. The Content Usage Information would be updated to account for the provisions of the DRM license granted in the third party domain.

The mediation service 2660 negotiates the scrambling algorithm, scrambling key exchange algorithm and the content format to be use in the transfer of content from the source device 2640 to the sink device 2690. The source device 2640 exchanges a content scrambling key with the sink device 2690 under the robustness rules applicable to the third party DRM. Either the Host device 2540, acting as a proxy for the mediation service 2660, or the mediation service 2660 itself provides the newly generated DRM license to the sink device 2690.

The mediation service 2660 instructs the Host device 2640 to translate the content format to one that is acceptable within the third party domain. This may involve reducing the resolution of the content or a complete change of audio format, e.g., MP3 to AAC.

The source device 2640 descrambles the content using the scrambling keys that are associated to that content and rescrambles the content for distribution to the sink device 2690 within the third party domain using a scrambling algorithm suitable for that domain. The source device 2640 may modify the CCI bits for Copy Once content to Copy No More, if this is required by the MSO usage rules 2626. However, the third party DRM may not be cognizant of the meaning of the CCI bits and the primary control is the DRM license supplied to the sink device 2690. At the end of a move operation the source device 2640 deletes its copy of the content. This requires the sink device 2690 to conduct a transactional exchange with the source device 2640 to indicate that the content transfer has been successfully accomplished. This could be performed through a mediation service 2660.

If the content is being copied, the source device 2640 updates its CUI to indicate that a copy has been provided to the sink device 2690 which may include identification of the DRM under which the sink device 2690 is controlled. The original content copy on the source device 2640 could have CCI bits that show Copy Once. The source device 2640 could change these to indicate that the content is Copy No More or could rely on the updated CUI associated with the content to limit further copying.

Content may need to be processed into a different format or limited to a specific resolution as part of the consumption, storage or export process. The source device 2640 needs to be capable of undertaking these format changes or of accessing a device that is capable of performing the format changes. It is imperative that at no time during content processing the content is exposed in the clear outside of the secure environment performing the content processing. Before moving content to an iPod, for example, the source device 2640 needs to change the audio format. Either source device or client device may have the processing capability to make this change. The device that does the processing needs to be a trusted device.

The source device 2640 attempts to discover a local device in its managed domain that advertises a conversion service that meets the needs for the conversion. The source device 2640 exchanges content scrambling keys with the iPod as described in the Export to a device in a third party domain use case. The source device exchanges content scrambling keys with the Host device 2640 under the control of the managed DRM.

The source device 2640 sends scrambled content to a device for a MP3 formatted file and receives scrambled content from the device containing an AAC formatted file. This device is responsible for descrambling the file content, performing the requested processing, and returning the rescrambled content to the source device 2640. The exchange should use different scrambling keys for security.

The source device 2640 descrambles the content and rescrambles the content for delivery to the iPod device. The source device 2640 performs the rescrambling operation. If the source device 2640 is capable of scrambling in the format for transmission to the iPod, the source device could securely pass the content scrambling keys exchanged with the iPod device. The source device 2640 could then prepare the content in its final form for the sink device 2690, i.e., the iPod, and return that to the source device 2640. The source device 2640 sends the content to the iPod 2690 and proceeds in the manner described in the Export to a device in a third party domain use case.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system providing content delivery to devices over a managed multimedia home network, comprising:
a domain manager for receiving content from a conditional access system, the domain manager being configured to communicate with a managed client device and a non-managed client device on the multimedia home network, the domain manager providing a secure domain for communication with the managed client device, the domain manager including a cable card, conditional access component and a DRM system,
wherein the DRM system includes a first content protection scheme and a second content protection scheme,
the first content protection scheme allowing communication with the non-managed client device via the multimedia home network, the non-managed client device being operative to provide viewing of a selected portion of the content from the conditional access system, and
the second content protection scheme providing encrypted communication with the managed client device via the secure domain, the managed client device being coupled to and registered with the domain manager, the domain manager and the managed client device being operative to instantiate the second content protection scheme as an overlay on top of the first content protection scheme, the managed client device being operative to provide viewing of all of the content from the conditional access system.

2. The system of claim 1, wherein the domain manager further comprises a hard disk drive (HDD) for storing the content therein.

3. The system of claim 1, wherein the DRM system includes an encryption engine and provides metadata to describe the content and a set of security rules.

4. The system of claim 1, wherein the DRM system is configured to provide a single managed content protection infrastructure with a common set of policies.

5. The system of claim 1, wherein the domain manager and the managed client device implement an DTCP protocol for providing protection of content communicated via the multimedia home network.

6. The system of claim 1, wherein the cable card re-encrypts and maps rights into the secure domain of the DRM system.

7. The system of claim 1, wherein the DRM system protects the content according to DRM usage rules provided by the conditional access system.

8. The system of claim 1, wherein the domain manager determines whether the managed client device is a DTCP-IP enabled device and, when the managed client device is the DTCP-IP enabled device determines whether to provide the content to the managed client device under control of the second content protection scheme via the secure domain or under the control of the first content protection scheme via DTCP/IP.

9. The system of claim 7, wherein the domain manager verifies that the managed client device is a member of the secure domain and that the DRM usage rules allow the content to be viewed on the managed client device.

10. The system of claim 1, wherein the domain manager provides a key to the managed client device for descrambling the encrypted communication provided to the managed client device.

11. The system of claim 1, wherein the domain manager descrambles and rescrambles the content for distribution to the managed client device and provides DRM usage rules to the managed client device when the content is acquired from the cable card.

12. The system of claim 1 further comprising the non-managed client device, the non-managed client device implements DTCP but does not run the second content protection scheme.

13. A method for providing content delivery to devices over a managed multimedia home network, comprising:
receiving content from a conditional access system at a domain manager, the domain manager being configured to communicate with a managed client device and a non-managed client device on the multimedia home network, the domain manager providing a secure domain for communication with managed client devices registered on the secure domain, the domain manager including a cable card, conditional access component and a DRM system, wherein the DRM system includes a first content protection scheme and a second content protection scheme, the first content protection scheme allowing communication with the non-managed client device via the multimedia home network to provide viewing of a selected portion of the content from the conditional access system and the second content protection scheme providing encrypted communication with the managed client device via the secure domain to provide viewing of all of the content from the conditional access system, the domain manager and the managed client device being operative to instantiate the second content protection scheme as an overlay on top of the first content protection scheme;

transmitting the selected portion of the content from the conditional access system via the first content protection scheme upon receipt of a request for the content from the non-managed client device; and transmitting all of the content from the conditional access system via the second content protection scheme upon receipt of a request for content from the managed client device.

14. The method of claim 13, wherein the receiving content at the domain manager further comprises receiving content from the conditional access system configured with communication both CCI and DRM metadata.

15. The method of claim 13, wherein the domain manager registers the managed client device by:

negotiating between the domain manager and the managed client device at a DTCP level;

authenticating the managed client device is permitted access to the secure domain of the domain manger manager;

providing only the selected portion of the content and the content based on CCI to the non-managed client device; and providing all of the content from the conditional access system to the managed client device that passes the authentication between the managed client device and the domain manger.

16. The method of claim 13, wherein instantiating the second content protection scheme as an overlay on top of the first content protection scheme further comprises verifying that the managed client device is a member of the secure domain and that DRM usage rules allow the content to be viewed on the managed client device.

17. A method for providing content delivery to devices over a multimedia home network, comprising:

receiving content from a conditional access system at a domain manager, the domain manager being configured to communicate with a managed client device and a non-managed client device on the multimedia home network, the domain manager including a cable card, conditional access component and a DRM system, wherein the DRM system includes a first content protection scheme and a second content protection scheme, the first content protection scheme allowing communication with the non-managed client device via the multimedia home network to provide viewing of a selected portion of the content from the conditional access system and the second content protection scheme providing encrypted communication with the managed client device via the secure domain to provide viewing of all of the content from the conditional access system;

transmitting the selected portion of the content from the conditional access system via the first content protection scheme upon receipt of a request for the content from the non-managed client device; and transmitting all of the content from the conditional access system via the second content protection scheme upon receipt of a request for content from the managed client device.

18. The method of claim 17, wherein the receiving content at the domain manager further comprises receiving content from the conditional access system configured with communication both CCI and DRM metadata.

19. The method of claim 17, wherein the domain manager registers the managed client device by:

negotiating between the domain manager and the managed client device at a DTCP level;

authenticating the managed client device is permitted access to all of the content from the domain manger via a secure domain.

20. The method of claim 19, further comprises instantiating the second content protection scheme as an overlay on top of the first content protection scheme by verifying that the managed client device is a member of the secure domain and that DRM usage rules allow the content to be viewed on the managed client device.

* * * * *